United States Patent
Naruse et al.

(10) Patent No.: US 12,103,080 B2
(45) Date of Patent: Oct. 1, 2024

(54) PARTICLE FILTRATION FROM AIR RECYCLING IN A THREE-DIMENSIONAL POWDER BED FUSION ADDITIVE MANUFACTURING APPARATUS

(71) Applicant: JEOL Ltd., Tokyo (JP)

(72) Inventors: Tatsuo Naruse, Tokyo (JP); Takayuki Shimizu, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 17/886,841

(22) Filed: Aug. 12, 2022

(65) Prior Publication Data

US 2023/0050527 A1    Feb. 16, 2023

(30) Foreign Application Priority Data

Aug. 13, 2021    (JP) .................................. 2021-131896

(51) Int. Cl.
| | |
|---|---|
| *B22F 12/70* | (2021.01) |
| *B01D 45/08* | (2006.01) |
| *B01D 46/10* | (2006.01) |
| *B01D 46/121* | (2022.01) |

(Continued)

(52) U.S. Cl.
CPC .............. *B22F 12/70* (2021.01); *B01D 46/10* (2013.01); *B01D 46/121* (2022.01); *B33Y 30/00* (2014.12); *B33Y 40/00* (2014.12); *B01D 45/08* (2013.01)

(58) Field of Classification Search
CPC ....... B01D 45/08; B01D 46/10; B01D 46/121
See application file for complete search history.

(56) References Cited

U.S. PATENT DOCUMENTS

| | | | | |
|---|---|---|---|---|
| 3,782,080 A | * | 1/1974 | Gallagher | .............. B01D 45/08 |
| | | | | 261/126 |
| 6,547,844 B2 | * | 4/2003 | Rikyuu | .................. B01D 45/08 |
| | | | | 55/DIG. 15 |

(Continued)

FOREIGN PATENT DOCUMENTS

| | | |
|---|---|---|
| CN | 108788150 A | 11/2018 |
| DE | 102015010387 A1 | 2/2017 |

(Continued)

OTHER PUBLICATIONS

Office Action issued in JP2021131896 on Dec. 5, 2023.
Extended European Search Report issued in EP22189581.6 on Oct. 26, 2022.

*Primary Examiner* — Emmanuel S Luk
*Assistant Examiner* — Nicholas J Chidiac
(74) *Attorney, Agent, or Firm* — The Webb Law Firm

(57) ABSTRACT

A vacuum pump that evacuates an inside of a vacuum chamber and powder capturing devices disposed on an intake side of the vacuum pump are included. The powder capturing devices include a plurality of flow path forming units that form a continuous gas flow path from an intake unit located on the vacuum chamber side to an exhaust unit located on the vacuum pump side. The plurality of flow path forming units include a first flow path forming unit having a first catching unit that causes the powder sucked from the intake unit to collide and then catch the powder, and a second flow path forming unit having a second catching unit that causes the powder passing through the first flow path forming unit to collide and then catch the powder.

5 Claims, 12 Drawing Sheets

(51) Int. Cl.
*B33Y 30/00* (2015.01)
*B33Y 40/00* (2020.01)

(56) References Cited

U.S. PATENT DOCUMENTS

| | | | | |
|---|---|---|---|---|
| 6,835,221 | B2 * | 12/2004 | Rikyuu | B01D 46/12 55/467 |
| 7,314,558 | B1 * | 1/2008 | Jaroszczyk | B01D 46/70 210/493.1 |
| 7,323,106 | B2 * | 1/2008 | Jaroszczyk | B01D 46/521 210/493.1 |
| 11,175,596 | B2 * | 11/2021 | Nienhuys | B01D 45/08 |
| 2001/0003892 | A1 * | 6/2001 | Rikyuu | C23C 16/4412 55/444 |
| 2002/0100417 | A1 | 8/2002 | Suzuki et al. | |
| 2003/0101699 | A1 * | 6/2003 | Rikyuu | B01D 45/08 55/323 |
| 2007/0045167 | A1 * | 3/2007 | Jaroszczyk | B01D 46/12 210/493.1 |
| 2008/0011672 | A1 * | 1/2008 | Schwartz | B01D 46/121 55/467 |
| 2008/0011673 | A1 * | 1/2008 | Janikowski | B01D 46/0043 55/467 |
| 2011/0233133 | A1 * | 9/2011 | Wacker | B01D 46/58 210/493.1 |
| 2018/0015542 | A1 | 1/2018 | Muranaka | |
| 2018/0126460 | A1 | 5/2018 | Murphree et al. | |
| 2020/0094320 | A1 | 3/2020 | Krol et al. | |
| 2020/0222982 | A1 | 7/2020 | Aota | |
| 2020/0225591 | A1 * | 7/2020 | Nienhuys | G03F 7/70866 |
| 2022/0193783 | A1 | 6/2022 | Kawada | |
| 2023/0364545 | A1 * | 11/2023 | Peng | B01D 45/08 |

FOREIGN PATENT DOCUMENTS

| | | |
|---|---|---|
| DE | 102018115561 A1 | 1/2020 |
| JP | 2000070664 A | 3/2000 |
| JP | 2018009213 A | 1/2018 |
| JP | 20197051 A | 1/2019 |
| JP | 2019142019 A | 8/2019 |
| JP | 6915145 B1 | 8/2021 |
| WO | WO-2019159634 A1 * | 8/2019 |

* cited by examiner

PARTICLE FILTRATION FROM AIR RECYCLING IN A THREE-DIMENSIONAL POWDER BED FUSION ADDITIVE MANUFACTURING APPARATUS

CROSS REFERENCE TO RELATED APPLICATION

The application claims priority to Japanese Patent Application No. 2021-131896, filed Aug. 13, 2021, the disclosure of which is hereby incorporated by reference in its entirety.

BACKGROUND OF THE INVENTION

Field of the Invention

The present invention relates to a three-dimensional powder bed fusion additive manufacturing (PBF-AM) apparatus.

Description of Related Art

In recent years, there has been known a three-dimensional powder bed fusion additive manufacturing (PBF-AM) apparatus that irradiates metal powder spread in layers with an electron beam to melt and solidify the metal powder, and sequentially stacks solidified layers to form a manufactured object having a three-dimensional structure.

In this type of three-dimensional PBF-AM apparatus, individual powder particles are charged by irradiation of the electron beam, and a phenomenon in which powders are scattered in a smoke form by Coulomb repulsive force, that is, a phenomenon called smoke may occur (see JP 2019-7051 A).

In the three-dimensional PBF-AM apparatus, an inside of a vacuum chamber is maintained in a vacuum state by a vacuum pump to build the manufactured object. Therefore, when a smoke phenomenon occurs during building, the powder scattered by smoke may enter the vacuum pump and adversely affect the vacuum pump.

In addition, when a mesh-like or fibrous filter is disposed on an intake side of the vacuum pump in order to suppress intrusion of powder into the vacuum pump, flow of gas is hindered by presence of the filter. Therefore, exhaust efficiency is significantly reduced.

SUMMARY OF THE INVENTION

The present invention has been made to solve the above problems, and an object thereof is to provide a three-dimensional PBF-AM apparatus capable of suppressing the intrusion of powder into the vacuum pump without reducing the exhaust efficiency as much as possible.

The three-dimensional PBF-AM apparatus according to the present invention includes a stage on which the powder is spread, the vacuum chamber in which the stage is disposed, the vacuum pump that evacuates the gas in the vacuum chamber, and a powder capturing device disposed on the intake side of the vacuum pump. The powder capturing device includes a plurality of flow path forming units that form a continuous gas flow path from an intake unit located on the vacuum chamber side to an exhaust unit located on the vacuum pump side. The plurality of flow path forming units at least include a first flow path forming unit having a first catching unit that causes powder sucked from the intake unit to collide to catch the powder, and a second flow path forming unit having a second catching unit that causes the powder passing through the first flow path forming unit to collide to catch the powder.

According to the present invention, it is possible to suppress the intrusion of powder into the vacuum pump without reducing the exhaust efficiency as much as possible.

DESCRIPTION OF THE INVENTION

Hereinafter, embodiments of the present invention will be described in detail with reference to the drawings. In the present description and the drawings, elements having substantially the same function or configuration are denoted by the same numerals, and redundant description is omitted.

First Embodiment

Figure 1:
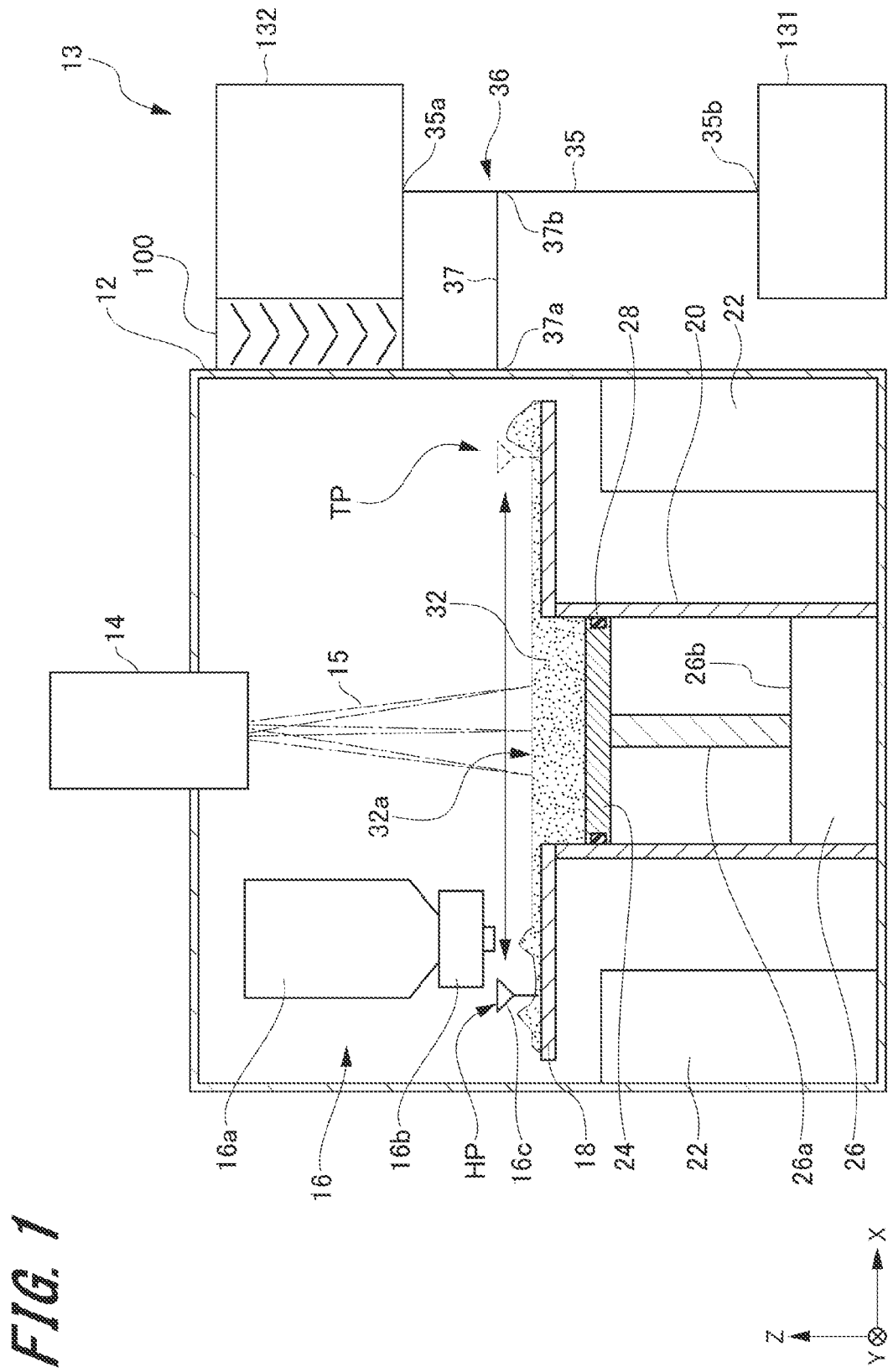
FIG. 1 is a side view schematically showing a configuration of a three-dimensional PBF-AM apparatus according to a first embodiment of the present invention.

FIG. 1 is a side view schematically illustrating a configuration of a three-dimensional PBF-AM apparatus according to a first embodiment of the present invention. In the following description, in order to clarify shapes, positional relationship, and the like of each part of the three-dimensional PBF-AM apparatus, a horizontal direction in FIG. 1 is referred to as an X direction, a depth direction in FIG. 1 is referred to as a Y direction, and a vertical direction in FIG. 1 is referred to as a Z direction. The X direction, the Y direction, and the Z direction are directions orthogonal to each other. Furthermore, the X direction and the Y direction are parallel to a horizontal direction, and the Z direction is parallel to a vertical direction (a perpendicular direction).

As illustrated in FIG. 1, the three-dimensional PBF-AM apparatus 10 includes a vacuum chamber 12, a vacuum pump 13, a beam irradiation device 14, a powder supply device 16, a building table 18, a build box 20, a collection box 22, a stage 24, a stage moving device 26, and a powder capturing device 100.

The vacuum chamber 12 is a chamber that forms a sealed space. In the space formed by the vacuum chamber 12, the powder supply device 16, the building table 18, the stage 24, and the like, which are elements necessary for building the manufactured object, are disposed.

The vacuum pump 13 is a pump that evacuates gas (including air) in the vacuum chamber 12. The vacuum pump 13 is maintained in an operating state at least during the building. The period during the building refers to a period from start to end of the building of the manufactured object. The driving of the vacuum pump 13 is controlled by an exhaust control unit (not illustrated). In the present embodiment, as an example, the vacuum pump 13 includes a roughing pump 131 and a main pump 132.

The roughing pump 131 is a pump that evacuates the inside of the vacuum chamber 12 from atmospheric pressure to a first degree of vacuum. The roughing pump 131 is also called an auxiliary pump. The main pump 132 is a pump that evacuates the inside of the vacuum chamber 12 from the first degree of vacuum to a second degree of vacuum that is higher than the first degree of vacuum. The second degree of vacuum is a degree of vacuum required for building the manufactured object in the vacuum chamber 12. The roughing pump 131 is configured by, for example, an oil rotary pump, and the main pump 132 is configured by, for example, a turbo molecular pump.

The roughing pump 131 and the main pump 132 are connected by an exhaust pipe 35. One end portion 35a of the exhaust pipe 35 is connected to an exhaust port (not illustrated) of the main pump 132, and the other end portion 35b of the exhaust pipe 35 is connected to an intake port (not illustrated) of the roughing pump 131. The exhaust pipe 35 is provided with a branch unit 36. An exhaust pipe 37 is connected to the branch unit 36 of the exhaust pipe 35. One end portion 37a of the exhaust pipe 37 is connected to the vacuum chamber 12, and the other end portion 37b of the exhaust pipe 37 is connected to the exhaust pipe 35 at the branch unit 36.

The beam irradiation device 14 is a device that irradiates a manufactured surface 32a with the electron beam 15. The manufactured surface 32a corresponds to an upper surface of a metal powder 32 spread on the stage 24.

Although not illustrated, the beam irradiation device 14 includes an electron gun that is a generation source of the electron beam and an optical system that controls the electron beam generated by the electron gun. The optical system includes a focusing lens, an objective lens, a deflection lens, and the like. The focusing lens is a lens that focuses an electron beam 15 generated by the electron gun. The objective lens is a lens for focusing the electron beam 15 focused by the focusing lens in the vicinity of the manufactured surface 32a. The deflection lens is a lens that deflects the electron beam 15 to cause the electron beam 15 to scan on the manufactured surface 32a.

The powder supply device 16 is a device that supplies the metal powder 32, which is a raw material for the manufactured object, onto the building table 18. The powder supply device 16 includes a hopper 16a, a powder drop device 16b, and an arm 16c. The hopper 16a is a container for storing the metal powder. The powder drop device 16b is a device that drops the metal powder stored in the hopper 16a onto the building table 18. The arm 16c is a long-shaped member elongated in the Y direction. The arm 16c spreads the metal powder dropped by the powder drop device 16b on the building table 18 and the stage 24. The arm 16c is provided to be movable in the X direction in order to uniformly spread the metal powder on the entire surface of the building table 18 and the stage 24.

The building table 18 is horizontally disposed inside the vacuum chamber 12. The building table 18 is disposed below the powder supply device 16. A central portion of the building table 18 is opened. An opening shape of the building table 18 is circular in plan view or angular in plan view.

The build box 20 is a box that forms a space for manufacturing. The build box 20 is formed in a tubular shape. The build box 20 is disposed in a state of surrounding the stage 24. A cross-sectional shape of the build box 20 is the same as the opening shape of the building table 18. For example, when the opening shape of the building table 18 is circular in plan view, the cross-sectional shape of the build box 20 is circular, and when the opening shape of the building table 18 is angular in plan view, the cross-sectional shape of the build box 20 is angular. In the present embodiment, as an example, the opening shape of the building table 18 is assumed to be circular in plan view.

The collection box 22 is a box that recovers the excess metal powder 32 among the metal powders 32 supplied onto the building table 18 by the powder supply device 16. One collection box 22 is provided on each of one side and the other side in the X direction.

The stage 24 is horizontally disposed inside the vacuum chamber 12. The stage 24 is provided to be movable in the vertical direction (the Z direction). The stage 24 slides in the vertical direction along an inner peripheral surface of the build box 20. A seal member 28 is attached to an outer peripheral portion of the stage 24. The seal member 28 is a member that maintains slidability and sealability between the outer peripheral portion of the stage 24 and the inner peripheral surface of the build box 20. The seal member 28 is made of a material having heat resistance and elasticity.

The stage moving device 26 is a device that moves the stage 24 in the vertical direction. The stage moving device 26 includes a shaft 26a and a drive mechanism unit 26b. The shaft 26a is connected to a lower surface of the stage 24. The drive mechanism unit 26b includes a motor and a power transmission mechanism (not illustrated), and drives the power transmission mechanism using the motor as a drive source to move the stage 24 integrally with the shaft 26a in the vertical direction. The power transmission mechanism includes, for example, a rack and pinion mechanism, a ball screw mechanism, and the like.

The powder capturing device 100 is a device that captures the metal powder 32 floating in the vacuum chamber 12. The powder capturing device 100 is disposed on the intake side of the vacuum pump 13, more specifically, on the intake side of the main pump 132. The configuration of the powder capturing device 100 will be described in detail later.

Next, basic procedures in a case of forming the manufactured object having a three-dimensional structure using the three-dimensional PBF-AM apparatus 10 having the configuration described above will be described.

First, when starting the building of the manufactured object, it is necessary to bring the space in the vacuum chamber 12 into the vacuum state by the operation of exhaust control unit (not illustrated) on the vacuum pump 13 prior to the building. At that time, the exhaust control unit operates the roughing pump 131 first, and then operates the main pump 132. Details will be described below.

First, the exhaust control unit operates the roughing pump 131 to suck the gas in the vacuum chamber 12, to evacuate the inside of the vacuum chamber 12 from the atmospheric pressure to the first degree of vacuum. At this time, the gas in the vacuum chamber 12 is sucked by the roughing pump 131 through the exhaust pipe 37, the branch unit 36, and the exhaust pipe 35, and is discharged from the exhaust port of the roughing pump 131.

Next, the exhaust control unit operates the main pump 132 to suck the gas in the vacuum chamber 12 while operating the roughing pump 131, to evacuate the inside of the vacuum chamber 12 from the first degree of vacuum to the second degree of vacuum. At this time, the gas in the vacuum chamber 12 is sucked by the main pump 132 through the powder capturing device 100 and discharged from the exhaust port of the main pump 132. Further, the gas discharged from the exhaust port of the main pump 132 is sucked by the roughing pump 131 through the exhaust pipe 35 and discharged from the exhaust port of the roughing pump 131. Thereafter, the exhaust control unit maintains both the roughing pump 131 and the main pump 132 in the operating state from the start to the end of the building of the manufactured object. The reason why the roughing pump 131 is operated during the building is to maintain the back pressure of the main pump 132 at a predetermined level.

In a case of building the manufactured object by bringing the inside of the vacuum chamber 12 into the vacuum state as described above, the metal powder 32 is spread into layers on the stage 24 in a state where the upper surface of the stage 24 is lower than the upper surface of the building table 18. At this time, the powder supply device 16 operates as follows. First, the metal powder stored in the hopper 16a is weighed by the powder drop device 16b, so that a predetermined amount of the metal powder 32 is dropped from the powder drop device 16b onto the building table 18. Next, the arm 16c reciprocates in the X direction. Specifically, the arm 16c moves from a home position HP to a turning position TP, and then returns from the turning position TP to the home position HP. Accordingly, the metal powder 32 is uniformly spread over the entire surfaces of the building table 18 and the stage 24. In addition, the excess metal powder 32 is recovered in the collection box 22.

Next, the beam irradiation device 14 irradiates the upper surface (the manufactured surface 32a) of the metal powder 32 with the electron beam 15 to pre-sinter the metal powder 32. At this time, the beam irradiation device 14 irradiates a wider range than a target manufactured object with the electron beam 15, and defocuses the electron beam 15 such that the metal powder 32 is not excessively heated.

Next, the beam irradiation device 14 irradiates the upper surface of the metal powder 32 with the electron beam 15 to melt and solidify the metal powder 32 as a pre-sintered body. This step is also referred to as a main sintering step. In the main sintering step, the beam irradiation device 14 scans the electron beam 15 based on two-dimensional data obtained by slicing three-dimensional Computer-Aided Design (CAD) data of the target manufactured object to a certain thickness, thereby selectively melting the metal powder 32 on the stage 24. The metal powder 32 melted by the irradiation of the electron beam 15 is solidified after the electron beam 15 passes.

Next, as a preparation for spreading the metal powder 32 of the next layer, the beam irradiation device 14 irradiates the upper surface of the metal powder 32 with the electron beam 15 to preheat the metal powder 32. At this time, the beam irradiation device 14 defocuses the electron beam 15.

Next, the stage moving device 26 lowers the stage 24 by a predetermined amount. The predetermined amount corresponds to a thickness of one layer when the manufactured object is built by lamination.

Thereafter, the above operation is repeated until the building of the manufactured object is completed. The building of the manufactured object is completed when the metal powder 32 is melted and solidified by the number of layers necessary for the building of the manufactured object. Thus, the target manufactured object is obtained.

In the three-dimensional PBF-AM apparatus 10, the smoke phenomenon may occur during the building. The smoke phenomenon is a phenomenon in which when the metal powder 32 spread on the stage 24 is irradiated with the electron beam 15, the metal powder 32 is scattered in the smoke form by the Coulomb repulsive force, and the metal powder 32 floats in the vacuum chamber 12. When the smoke phenomenon occurs during the building, there is a risk that the metal powder 32 floating in the vacuum chamber 12 is sucked into the vacuum pump 13, which may adversely affect the vacuum pump 13. Specifically, when the metal powder 32 is sucked into the main pump 132, there is a risk that the metal powder 32 hits a blade that is being rotated at a high speed and is built in the main pump 132, leading to wearing of the blade. In addition, when the metal powder 32 is sucked into the roughing pump 131, there is a risk that the metal powder 32 may be mixed into an operating oil of the roughing pump 131, and a smooth operation of the roughing pump 131 may be hindered. Therefore, in the present embodiment, a configuration in which the powder capturing device 100 is provided between the vacuum chamber 12 and the main pump 132 is adopted. Hereinafter, the configuration of the powder capturing device 100 will be described in detail.

Figure 2:
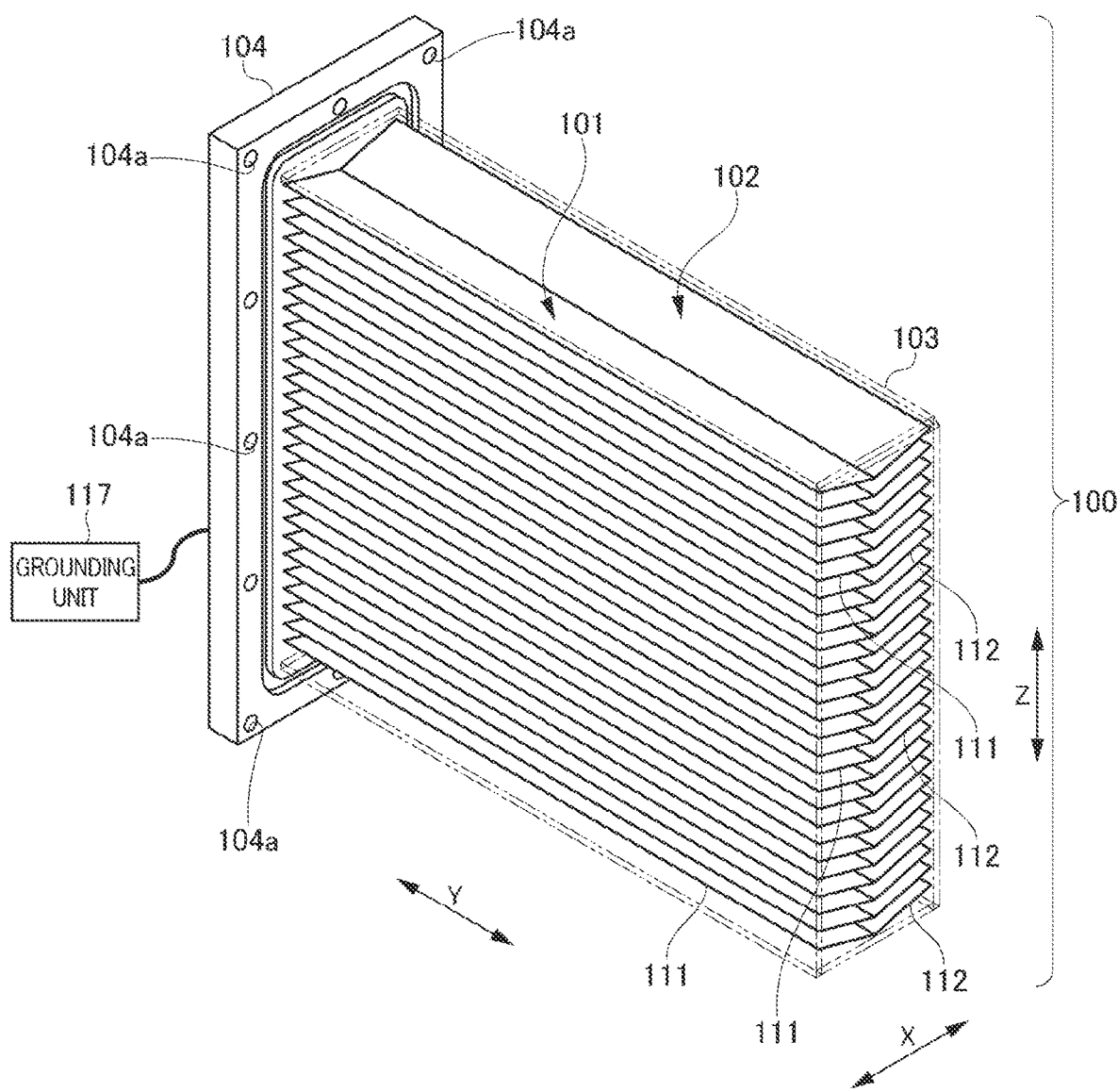
FIG. 2 is a perspective view illustrating a configuration of a powder capturing device included in the three-dimensional PBF-AM apparatus according to the first embodiment of the present invention.

FIG. 2 is a perspective view illustrating a configuration of a powder capturing device included in the three-dimensional PBF-AM apparatus according to the first embodiment of the present invention. Furthermore, FIG. 3 is a longitudinal sectional view of the powder capturing device illustrated in FIG. 2, and FIG. 4 is an enlarged view of the portion A in FIG. 3.

Figure 3:
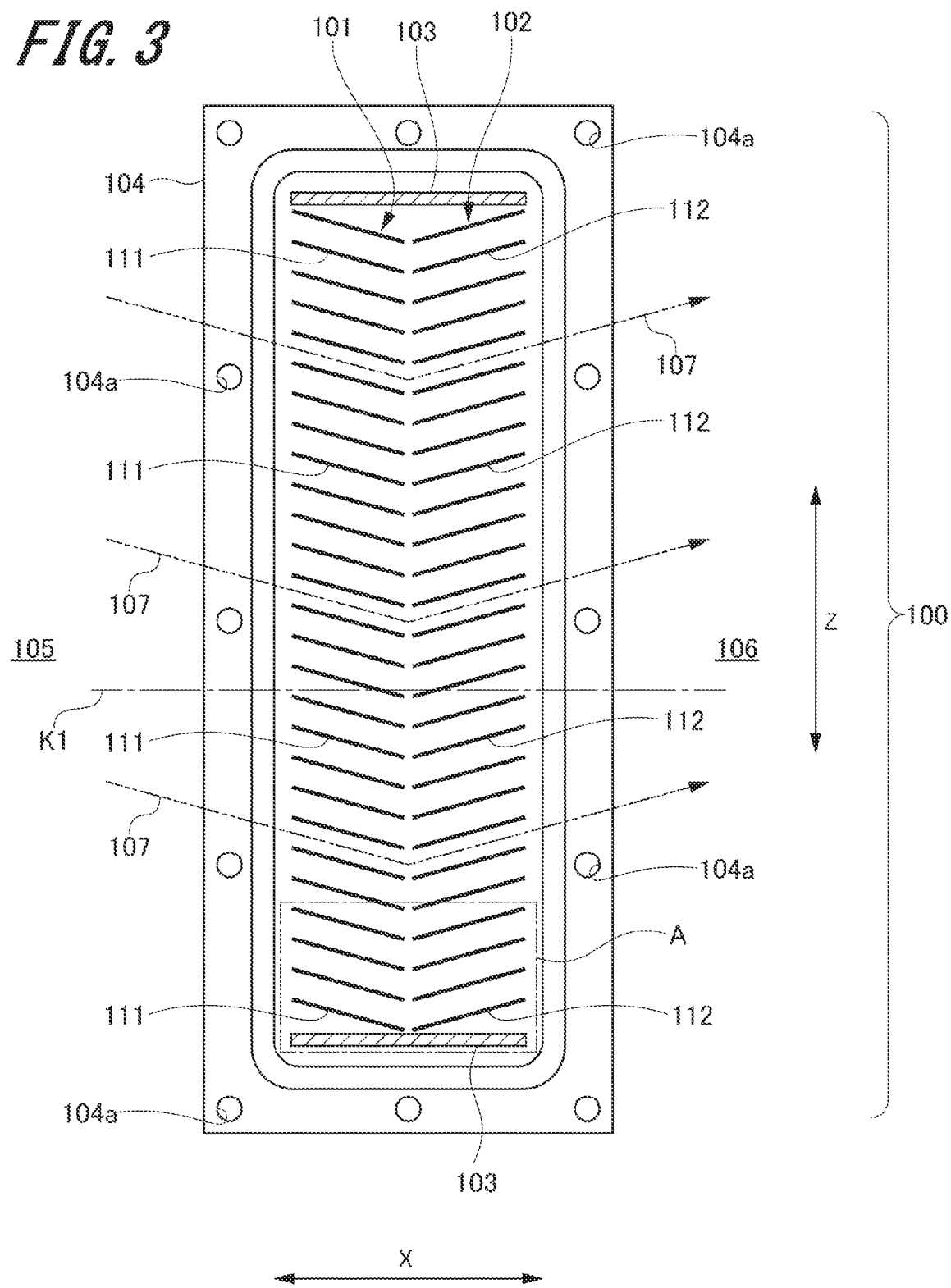
FIG. 3 is a longitudinal sectional view of the powder capturing device shown in FIG. 2.
Figure 4:
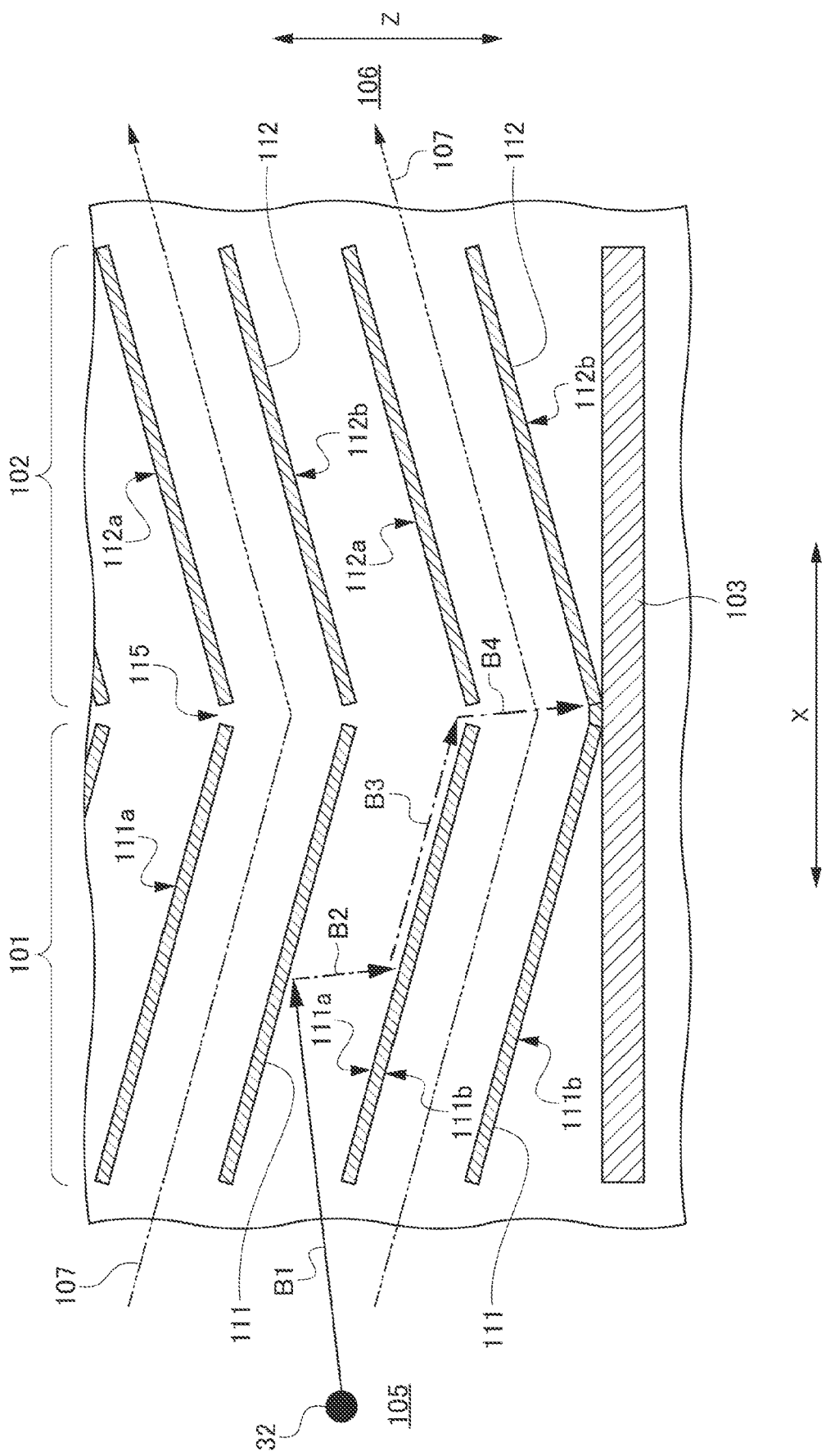
FIG. 4 is an enlarged view of the portion A in FIG. 3.

As illustrated in FIGS. 2 to 4, the powder capturing device 100 includes a first flow path forming unit 101, a second flow path forming unit 102, a support frame 103, and a flange 104. Furthermore, in FIG. 2, the support frame 103 is transparent in order to be able to confirm the structures of the first flow path forming unit 101 and the second flow path forming unit 102.

(First Flow Path Forming Unit 101 and Second Flow Path Forming Unit 102)

As illustrated in FIGS. 3 and 4, the first flow path forming unit 101 and the second flow path forming unit 102 form gas flow paths 107 continuous from an intake unit 105 to an exhaust unit 106. The intake unit 105 is a portion located on the vacuum chamber 12 side. The exhaust unit 106 is a portion located on the main pump 132 side. The gas flow paths 107 are portions through which the gas sucked from the vacuum chamber 12 to the main pump 132 flows when the gas in the vacuum chamber 12 is evacuated due to the operation of the main pump 132. The state in which the gas flow paths 107 are continuous refers to a state in which there is no obstacle that hinders the flow of gas in the middle of the gas flow paths 107, and the gas flow paths 107 are communicated from the intake unit 105 to the exhaust unit 106. As an obstacle that hinders the flow of gas, for example, a porous body such as a mesh-like or fibrous body can be considered.

The first flow path forming unit 101 includes a plurality of first plate-shaped units 111, and the second flow path forming unit 102 includes a plurality of second plate-shaped units 112. Each of the first plate-shaped units 111 is inclined upward to the left in FIG. 3 with respect to a reference axis line K1 (see FIG. 3) connecting the intake unit 105 and the exhaust unit 106, and each of the second plate-shaped units 112 is inclined upward to the right in FIG. 3 with respect to the reference axis line K1. In other words, the first plate-shaped units 111 and the second plate-shaped units 112 are inclined in directions opposite to each other with respect to the reference axis line K1. Furthermore, the first plate-shaped units 111 and the second plate-shaped units 112 are disposed in a V shape when viewed from the side of the gas flow paths 107 (the Y direction in FIG. 2). The reference axis line K1 is an axis parallel to the X direction.

As illustrated in FIG. 4, an upper surface 111a and a lower surface 111b, which are main surfaces of the first plate-shaped units 111, are in a front-back positional relationship, and an upper surface 112a and a lower surface 112b, which are main surfaces of the second plate-shaped units 112, are also in the front-back positional relationship. The upper surface 111a and the lower surface 111b of the first plate-shaped units 111 each correspond to the first catching unit. The first catching unit is a portion that causes the powder sucked from the intake unit to collide to catch the powder. The upper surface 112a and the lower surface 112b of the second plate-shaped units 112 each correspond to the second catching unit. The second catching unit is located on a downstream side of the first catching unit in the gas flow path, and is a portion that causes the powder passing through the first flow path forming unit to collide to catch the powder.

Furthermore, the first plate-shaped units 111 and the second plate-shaped units 112 are disposed in a plurality of stages at predetermined intervals in the Z direction. Then, one gas flow path 107 is formed between the first plate-shaped units 111 and the second plate-shaped units 112 disposed on the $M^{th}$ step (M is a natural number) from the top in the Z direction and the first plate-shaped units 111 and the second plate-shaped units 112 disposed on the $M+1^{th}$ step adjacent thereto. In other words, similarly to the first plate-shaped units 111 and the second plate-shaped units 112, the gas flow paths 107 are formed over a plurality of stages in the Z direction.

In addition, the first plate-shaped units 111 and the second plate-shaped units 112 have a drop unit 115 (see FIG. 4) for dropping the metal powder 32 into a lower stage. The drop unit 115 is provided at a V-shaped bent portion which is a boundary portion between the first plate-shaped units 111 and the second plate-shaped units 112. The drop unit 115 is preferably formed in a slit shape elongated in the Y direction. In addition, the drop unit 115 is not provided in the first plate-shaped units 111 and the second plate-shaped units 112 disposed at the lowermost stage, but is provided in the first plate-shaped units 111 and the second plate-shaped units 112 positioned at an upper stage of the lowermost stage.

(Support Frame 103)

The support frame 103 is a member that supports the plurality of first plate-shaped units 111 constituting the first flow path forming unit 101 and the plurality of second plate-shaped units 112 constituting the second flow path forming unit 102. The plurality of first plate-shaped units 111 and the plurality of second plate-shaped units 112 are attached to the inside of the support frame 103. The support frame 103 is formed in a lateral U shape or a quadrangular shape when viewed from the X direction in such way to surround the plurality of first plate-shaped units 111 and the plurality of second plate-shaped units 112 from three directions or four directions.

(Flange 104)

The flange 104 is a member for attaching the powder capturing device 100 to the exhaust pipe (not illustrated). The exhaust pipe to which the powder capturing device 100 is attached is an exhaust pipe that connects the vacuum chamber 12 and the main pump 132. The flange 104 is formed in a plate shape elongated in the Z direction. The flange 104 is provided with a plurality of attachment holes 104a. The attachment holes 104a are holes for attaching the flange 104 to the exhaust pipe (not illustrated) in a fixed state by screwing. The exhaust pipe (not illustrated) is provided with a rectangular opening portion into which the first flow path forming unit 101, the second flow path forming unit 102, and the support frame 103 can be inserted and removed; and the flange 104 is attached to the exhaust pipe in such a way to close the opening portion.

When the powder capturing device 100 is attached to the exhaust pipe (not illustrated), the intake unit 105 is disposed facing the vacuum chamber 12 side, and the exhaust unit 106 is disposed facing the main pump 132 side. Furthermore, the first flow path forming unit 101 and the second flow path forming unit 102 are disposed inside the exhaust pipe (not illustrated), and the support frame 103 is disposed in contact with an inner wall surface of the exhaust pipe (not illustrated). As a result, the gas flowing through the exhaust pipe due to the operation of the main pump 132 passes through the gas flow paths 107 of the powder capturing device 100.

The first flow path forming unit 101, the second flow path forming unit 102, the support frame 103, and the flange 104 described above are all made of a metal material (for example, stainless steel or the like), and are electrically connected to each other by physical contact. Furthermore, the first flow path forming unit 101 and the second flow path forming unit 102 are electrically connected to a grounding unit 117 (see FIG. 2) via the support frame 103 and the flange 104. Moreover, the first flow path forming unit 101 and the second flow path forming unit 102 may be electrically connected directly to the grounding unit 117 without passing through the support frame 103 and the flange 104.

Next, the function of the powder capturing device 100 having the above configuration will be described.

The powder capturing device 100 mainly has two functions. One is ventilation function and the other is powder capturing function. Each function will be described below.

(Ventilation Function)

When the gas in the vacuum chamber 12 is evacuated by the vacuum pump 13, the gas in the vacuum chamber 12 is sucked by the main pump 132 through the powder capturing device 100 and exhausted from the exhaust port of the main pump 132. At this time, in the portion where the powder capturing device 100 is disposed, the gas flows from the intake unit 105 toward the exhaust unit 106. Furthermore, the gas flows through the gas flow paths 107 formed in a plurality of stages in the Z direction. In the present embodiment, the gas flow paths 107 are continuous from the intake unit 105 to the exhaust unit 106. Therefore, the flow of gas passing through the gas flow paths 107 is not hindered. Accordingly, the gas in the vacuum chamber 12 can be efficiently evacuated.

(Powder Capturing Function)

When the smoke phenomenon occurs during the building, the metal powder 32 floating in the vacuum chamber 12 may move toward the powder capturing device 100 by a suction force of the vacuum pump 13 (mainly the main pump 132).

In that case, the metal powder 32 moves linearly toward the powder capturing device 100. As a specific example, as illustrated in FIG. 4, when the metal powder 32 moves in a direction B1 toward the powder capturing device 100, the metal powder 32 collides with the lower surface 111b of the first plate-shaped units 111. As a result, kinetic energy of the metal powder 32 is lost. Therefore, the metal powder 32 can be captured in the first flow path forming unit 101. Furthermore, although not illustrated, the metal powder 32 may pass through the first flow path forming unit 101 depending on the direction of the metal powder 32 moving toward the powder capturing device 100. However, the metal powder 32 having passed through the first flow path forming unit 101 collides with the upper surface 112a of the second plate-shaped units 112, and accordingly, the kinetic energy of the metal powder 32 is lost. Therefore, the metal powder 32 can be captured in the second flow path forming unit 102.

As described above, the powder capturing device 100 captures the metal powder 32 by collision with the first plate-shaped units 111 or the second plate-shaped units 112. Therefore, by disposing the powder capturing device 100 on the intake side of the main pump 132, it is possible to suppress the intrusion of the metal powder 32 into the main pump 132. In addition, since the roughing pump 131 is disposed on the exhaust side of the main pump 132, the intrusion of the metal powder 32 into the roughing pump 131 can be suppressed by capturing the metal powder 32 using the powder capturing device 100 as described above.

The powder capturing device 100 according to the present embodiment can suppress the intrusion of powder into the vacuum pump 13 without reducing the exhaust efficiency as much as possible by the two functions described above.

Furthermore, in the present embodiment, the first plate-shaped units 111 and the second plate-shaped units 112 are inclined in different directions from each other with respect to the reference axis line K1 connecting the intake unit 105 and the exhaust unit 106. Therefore, the metal powder 32 can collide with the first plate-shaped units 111 or the second plate-shaped units 112 without hindering the flow of gas.

Moreover, in the present embodiment, the first plate-shaped units 111 and the second plate-shaped units 112 are disposed in a V shape. Therefore, the metal powder 32 captured due to the collision with the first plate-shaped units 111 or the second plate-shaped units 112 can be retained in the powder capturing device 100 without rolling down to the vacuum chamber 12 side or the main pump 132 side.

In addition, the powder capturing device 100 according to the present embodiment has the drop unit 115 for dropping the metal powder 32 captured due to the collision with the first plate-shaped units 111 or the second plate-shaped units 112 into the lower stage. Therefore, as illustrated in FIG. 4 described above, the metal powder 32 that has collided with the lower surface 111b of the first plate-shaped units 111 falls in a B2 direction, then moves in a B3 direction along the upper surface 111a of the first plate-shaped units 111, and falls in a B4 direction through the drop unit 115. Furthermore, although not illustrated, the metal powder 32 that has passed through the first flow path forming unit 101 and collided with the upper surface 112a of the second plate-shaped units 112 moves along the upper surface 112a of the second plate-shaped units 112 and then falls through the drop unit 115. Therefore, the metal powder 32 captured due to the collision with the first plate-shaped units 111 or the second plate-shaped units 112 can be collected at the boundary portion (the bent portion) between the first plate-shaped units 111 and the second plate-shaped units 112 disposed in the lower stage (the lowermost stage in the present embodiment). As a result, it is possible to easily perform a recovery operation of the captured metal powder 32 and a cleaning operation after the recovery.

In addition, the metal powder 32 moving toward the powder capturing device 100 enters at any angle from any position in the Z direction without being limited to the B1 direction illustrated in FIG. 4. Therefore, in the present embodiment, as a preferred aspect, the plurality of first plate-shaped units 111 and the plurality of second plate-shaped units 112 are disposed in a state where the facing cannot be linearly expected. This matter will be described with reference to FIG. 5.

Figure 5:
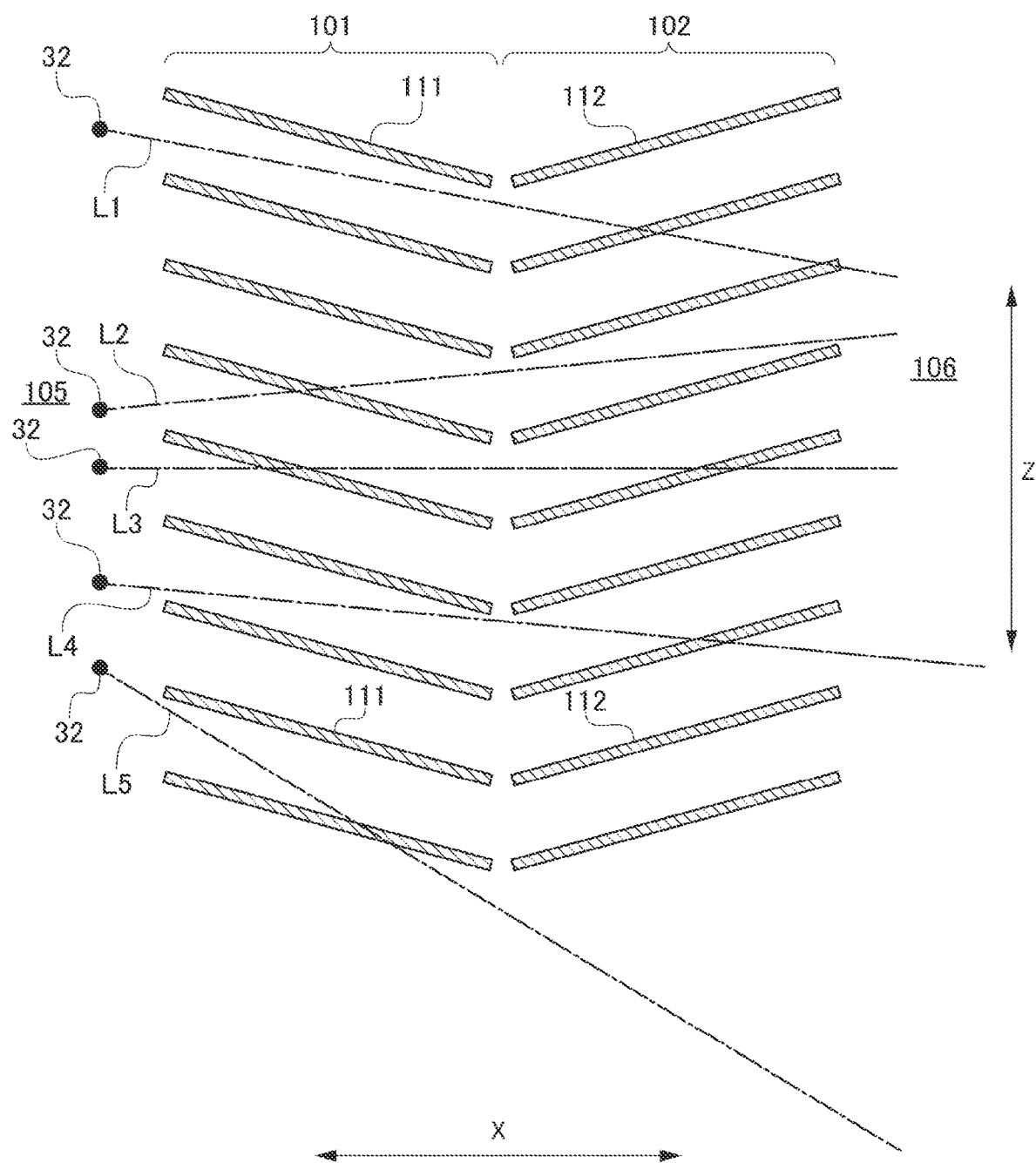
FIG. 5 is a view for explaining an aspect of the powder capturing device according to the first embodiment of the present invention.

First, as illustrated in FIG. 5, the state in which the facing cannot be linearly expected refers to a state in which at least one plate-shaped unit of the first plate-shaped units 111 and the second plate-shaped units 112 is present on any straight line connecting the intake unit 105 and the exhaust unit 106. FIG. 5 illustrates five straight lines L1, L2, L3, L4, and L5 as an example of any straight line. The five straight lines L1, L2, L3, L4, and L5 are straight lines having different positions in the Z direction on the intake unit 105 side. Furthermore, the five straight lines L1, L2, L3, L4, and L5 have different angles formed by the reference axis line K1 described above (see FIG. 3).

First, the first plate-shaped units 111 are not present and only the second plate-shaped units 112 are present on the straight line L1. Therefore, the metal powder 32 entering along the straight line L1 passes through the first flow path forming unit 101, then collides with the second plate-shaped units 112 and are captured.

Then, the second plate-shaped units 112 are not present, and only the first plate-shaped units 111 are present on the straight line L2. Accordingly, the metal powder 32 entering along the straight line L2 is captured due to the collision with the first plate-shaped units 111.

Furthermore, the first plate-shaped units 111 and the second plate-shaped units 112 are present on the straight line L3. Accordingly, the metal powder 32 entering along the straight line L3 is captured due to the collision with the first plate-shaped units 111.

Moreover, the first plate-shaped units 111 are not present, and only the second plate-shaped units 112 are present on the straight line L4. Accordingly, the metal powder 32 entering along the straight line L4 passes through the first flow path forming unit 101, then collides with the second plate-shaped units 112, and are captured.

Then, the second plate-shaped units 112 are not present, and only the first plate-shaped units 111 are present on the straight line L5. Accordingly, the metal powder 32 entering along the straight line L5 is captured due to the collision with the first plate-shaped units 111.

As described above, in the present embodiment, at least one plate-shaped unit of the first plate-shaped units 111 and the second plate-shaped units 112 is present on any straight line connecting the intake unit 105 and the exhaust unit 106. Therefore, the metal powder 32 entering the powder capturing device 100 from any direction can be reliably captured due to the collision with the first plate-shaped units 111 or the second plate-shaped units 112.

Furthermore, in the present embodiment, the first flow path forming unit 101 and the second flow path forming unit 102 are electrically connected to the grounding unit 117 via the support frame 103 and the flange 104. Accordingly, electric charges of the metal powder 32 can be removed by causing the metal powder 32 to collide with the first plate-shaped units 111 or the second plate-shaped units 112. In addition, the electric charges can be released to the grounding unit 117 such that the first plate-shaped units 111 and the second plate-shaped units 112 are not charged due to the collision with the metal powder 32.

Second Embodiment

Next, a second embodiment of the present invention will be described. The second embodiment is different from the first embodiment described above in the configuration of the powder capturing device.

Figure 6:
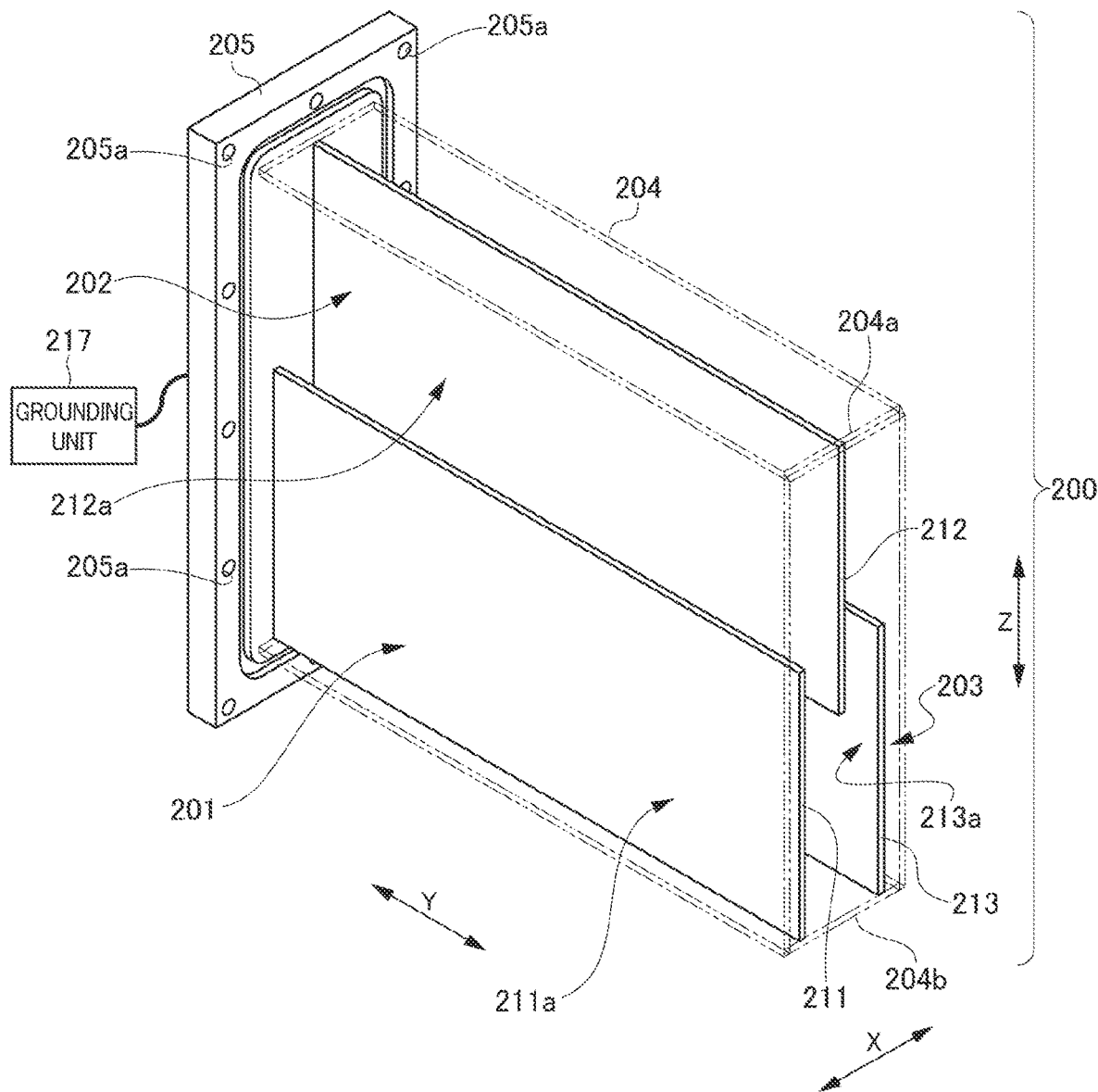
FIG. 6 is a perspective view illustrating a configuration of the powder capturing device included in the three-dimensional PBF-AM apparatus according to the second embodiment of the present invention.
Figure 7:
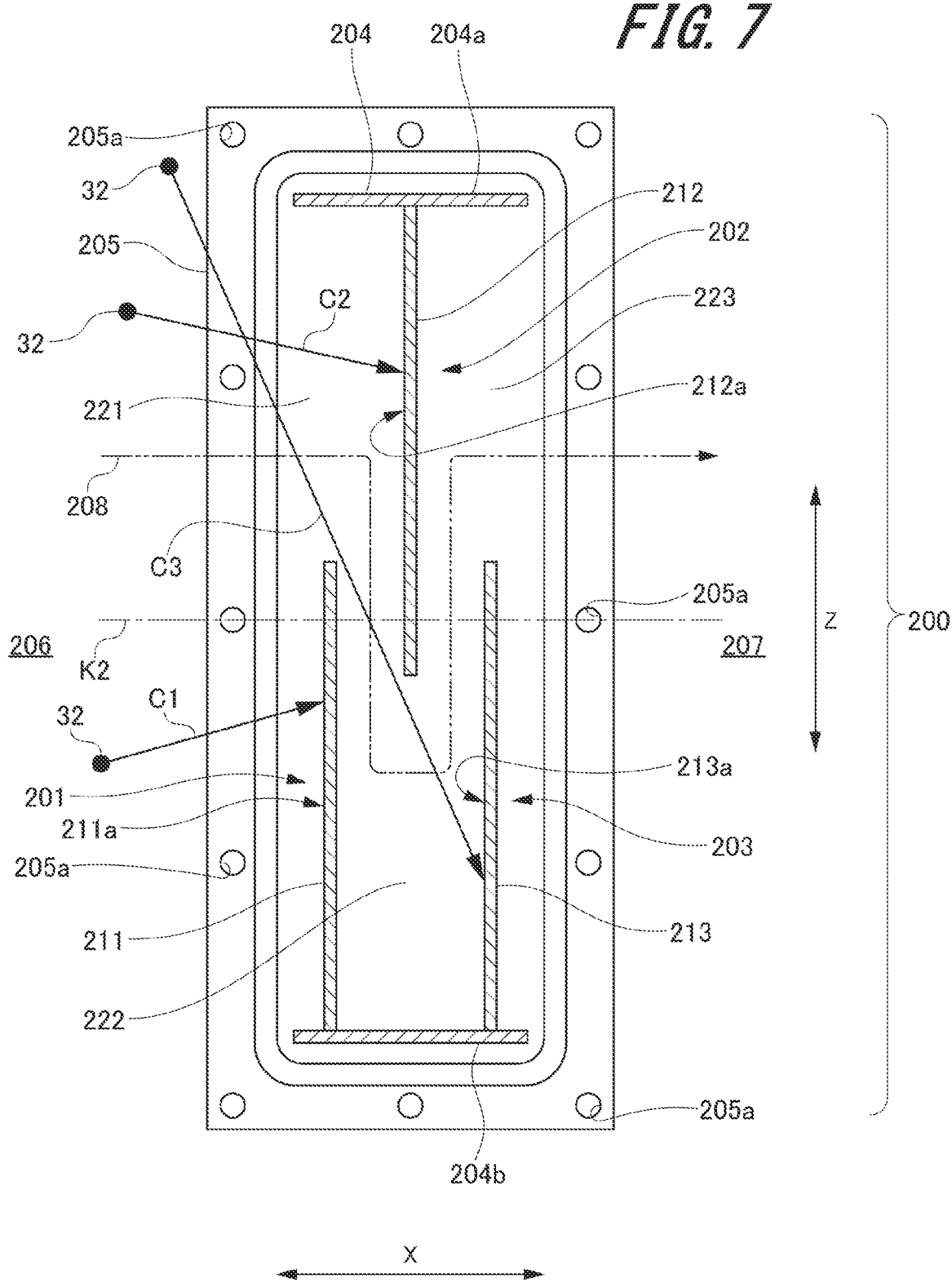
FIG. 7 is a longitudinal sectional view of the powder capturing device shown in FIG. 6.

FIG. 6 is a perspective view illustrating a configuration of a powder capturing device included in the three-dimensional PBF-AM apparatus according to the second embodiment of the present invention, and FIG. 7 is a longitudinal sectional view of the powder capturing device illustrated in FIG. 6.

As illustrated in FIGS. 6 and 7, a powder capturing device 200 includes a first flow path forming unit 201, a second flow path forming unit 202, a third flow path forming unit 203, a support frame 204, and a flange 205. Moreover, in FIG. 6, the support frame 204 is transparent in order to be able to confirm the structures of the first flow path forming unit 201, the second flow path forming unit 202, and the third flow path forming unit 203.

(First Flow Path Forming Unit 201, Second Flow Path Forming Unit 202, and Third Flow Path Forming Unit 203)

As illustrated in FIG. 7, the first flow path forming unit 201, the second flow path forming unit 202, and the third flow path forming unit 203 form a gas flow path 208 that is continuous from an intake unit 206 located on the vacuum chamber 12 side to an exhaust unit 207 located on the main pump 132 side. The gas flow path 208 is a portion through which the gas sucked from the vacuum chamber 12 to the main pump 132 flows when the gas in the vacuum chamber 12 is evacuated due to the operation of the main pump 132.

The first flow path forming unit 201 is constituted by one first plate-shaped unit 211, the second flow path forming unit 202 is constituted by one second plate-shaped unit 212, and the third flow path forming unit 203 is constituted by one third plate-shaped unit 213. Each of the plate-shaped units 211, 212, and 213 is formed in a rectangular shape when viewed from the X direction (a front surface). The first plate-shaped unit 211, the second plate-shaped unit 212, and the third plate-shaped unit 213 are disposed at predetermined intervals in the X direction. Furthermore, the first plate-shaped unit 211 and third plate-shaped unit 213 are disposed in a state of vertically rising from a lower side portion 204b of the support frame 204, and the second plate-shaped unit 212 is disposed in a state of vertically hanging from an upper side portion 204a of the support frame 204.

The first plate-shaped unit 211 is disposed in a direction orthogonal to a reference axis line K2 (see FIG. 7) connecting the intake unit 206 and the exhaust unit 207, and is disposed to be biased downward in the Z direction that is a direction orthogonal to the reference axis line K2. The direction orthogonal to the reference axis line K2 refers to a state parallel to a YZ plane. In addition, as illustrated in FIG. 7, the first plate-shaped unit 211 has a first ventilation unit 221 formed on an upper side opposite to a biasing direction of the first plate-shaped unit 211 in the Z direction. The first ventilation unit 221 is a portion that allows the gas to flow in the first flow path forming unit 201. The first ventilation unit 221 is formed between an upper end portion of the first plate-shaped unit 211 and the upper side portion 204a of the support frame 204 facing the upper end portion. A main surface 211a of the first plate-shaped unit 211 is disposed to face the intake unit 206 side. The main surface 211a of the first plate-shaped unit 211 corresponds to the first catching unit. The first catching unit is a portion that causes the powder sucked from the intake unit to collide to catch the powder.

The second plate-shaped unit 212 is disposed on the downstream side of the gas flow path 208 with respect to the first plate-shaped unit 211. The second plate-shaped unit 212 is disposed on the side opposite to the first plate-shaped unit 211 in the Z direction, that is, biasedly on the upper side. Furthermore, as illustrated in FIG. 7, the second plate-shaped unit 212 forms a second ventilation unit 222 on the lower side opposite to the biasing direction of the second plate-shaped unit 212 in the Z direction. The second ventilation unit 222 is a portion that allows the gas to flow in the second flow path forming unit 202. The second ventilation unit 222 is formed between the lower end portion of the second plate-shaped unit 212 and the lower side portion 204b of the support frame 204 facing the lower end portion. Moreover, the lower end portion of the second plate-shaped unit 212 is located below the upper end portion of the first plate-shaped unit 211. Accordingly, the first plate-shaped unit 211 and the second plate-shaped unit 212 are disposed in a state of partially overlapping in the Z direction. A main surface 212a of the second plate-shaped unit 212 is disposed to face the intake unit 206 side. The main surface 212a of the second plate-shaped unit 212 corresponds to the second catching unit. The second catching unit is located on the downstream side of the first catching unit in the gas flow path, and is a portion that causes the powder passing through the first flow path forming unit to collide to catch the powder.

The third plate-shaped unit 213 is disposed on the downstream side of the gas flow path 208 with respect to the second plate-shaped unit 212. The third plate-shaped unit 213 is disposed on the side opposite to the second plate-shaped unit 212 in the Z direction, that is, biasedly to the lower side. Then, as illustrated in FIG. 7, the third plate-shaped unit 213 forms a third ventilation unit 223 on an upper side opposite to the biasing direction of the third plate-shaped unit 213 in the Z direction. The third ventilation unit 223 is a portion that allows the gas to flow in the third flow path forming unit 203. The third ventilation unit 223 is formed between the upper end portion of the third plate-shaped unit 213 and the upper side portion 204a of the support frame 204 facing the upper end portion. Furthermore, the upper end portion of the third plate-shaped unit 213 is positioned above the lower end portion of the second plate-shaped unit 212. Accordingly, the second plate-shaped unit 212 and the third plate-shaped unit 213 are disposed in a state of partially overlapping in the Z direction. A main surface 213a of the third plate-shaped unit 213 is disposed to face the intake unit 206 side. The main surface 213a of the third plate-shaped unit 213 corresponds to a third catching unit. The third catching unit is a portion that is located on the downstream side of the second catching unit in the gas flow path and causes the powder passing through the second flow path forming unit to collide to catch the powder.

The gas flow path 208 is formed in such a way to pass through the first ventilation unit 221, the second ventilation unit 222, and the third ventilation unit 223. Furthermore, as illustrated in FIG. 7, the gas flow path 208 is bent in a U shape.

(Support Frame 204)

The support frame 204 is a member that supports the first plate-shaped unit 211 constituting the first flow path forming unit 201, the second plate-shaped unit 212 constituting the second flow path forming unit 202, and the third plate-shaped unit 213 constituting the third flow path forming unit 203. The first plate-shaped unit 211, the second plate-shaped unit 212, and the third plate-shaped unit 213 are respectively attached to the inside of the support frame 204. The support frame 204 is formed in a lateral U-shape or a quadrangular shape as viewed from the X direction in such a way to surround the first plate-shaped unit 211, the second plate-shaped unit 212, and the third plate-shaped unit 213 from three directions or four directions.

(Flange 205)

The flange 205 is a member for attaching the powder capturing device 200 to the exhaust pipe (not illustrated). The exhaust pipe to which the powder capturing device 200 is attached is an exhaust pipe that connects the vacuum chamber 12 and the main pump 132. The flange 205 is formed in a plate shape elongated in the Z direction. The flange 205 is provided with a plurality of attachment holes 205a. The attachment holes 205a are holes for attaching the flange 205 to the exhaust pipe (not illustrated) in a fixed state by screwing. The exhaust pipe (not illustrated) is provided with a rectangular opening portion into which the first flow path forming unit 201, the second flow path forming unit 202, the third flow path forming unit 203, and the support frame 204 can be inserted and removed; and the flange 205 is attached to the exhaust pipe in such a way to close the opening portion.

When the powder capturing device 200 is attached to the exhaust pipe (not illustrated), the intake unit 206 is disposed facing the vacuum chamber 12 side, and the exhaust unit 207 is disposed facing the main pump 132 side. Furthermore, the first flow path forming unit 201, the second flow path forming unit 202, and the third flow path forming unit 203 are disposed inside the exhaust pipe (not illustrated), and the support frame 204 is disposed in contact with the inner wall surface of the exhaust pipe (not illustrated). As a result, the gas flowing through the exhaust pipe due to the operation of the main pump 132 passes through the gas flow path 208 of the powder capturing device 200.

The first flow path forming unit 201, the second flow path forming unit 202, the third flow path forming unit 203, the support frame 204, and the flange 205 described above are all made of a metal material (for example, stainless steel or the like), and are electrically connected to each other by physical contact. Furthermore, the first flow path forming unit 201, the second flow path forming unit 202, and the third flow path forming unit 203 are electrically connected to a grounding unit 217 (see FIG. 6) via the support frame 204 and the flange 205. Moreover, the first flow path forming unit 201, the second flow path forming unit 202, and the third flow path forming unit 203 may be electrically connected directly to the grounding unit 217 without passing through the support frame 204 and the flange 205.

Next, the ventilation function and the powder capturing function of the powder capturing device 200 having the above configuration will be described.

(Ventilation Function)

When the gas in the vacuum chamber 12 is evacuated by the vacuum pump 13, the gas in the vacuum chamber 12 is sucked by the main pump 132 through the powder capturing device 200 and exhausted from the exhaust port of the main pump 132. At this time, in the portion where the powder capturing device 200 is disposed, the gas flows from the intake unit 206 toward the exhaust unit 207. Furthermore, the gas flows through the gas flow path 208 formed by the first flow path forming unit 201, the second flow path forming unit 202, and the third flow path forming unit 203. In the present embodiment, the gas flow path 208 is continuous from the intake unit 206 to the exhaust unit 207. Therefore, the flow of gas passing through the gas flow path 208 is not hindered. Accordingly, the gas in the vacuum chamber 12 can be efficiently evacuated.

(Powder Capturing Function)

When the smoke phenomenon occurs during the building, the metal powder 32 floating in the vacuum chamber 12 may move toward the powder capturing device 200 due to the suction force of the vacuum pump 13 (mainly the main pump 132). In that case, the metal powder 32 moves linearly toward the powder capturing device 200. As a specific example, as illustrated in FIG. 7, when the metal powder 32 moves in a C1 direction toward the powder capturing device 200, the metal powder 32 collides with the main surface 211a of the first plate-shaped unit 211. As a result, since the kinetic energy of the metal powder 32 is lost, the metal powder 32 can be captured in the first flow path forming unit 201. Furthermore, when the metal powder 32 moves in a C2 direction toward the powder capturing device 200, the metal powder 32 passes through the first ventilation unit 221 of the first flow path forming unit 201. However, the metal powder 32 having passed through the first ventilation unit 221 collides with the main surface 212a of the second plate-shaped unit 212, and accordingly, the kinetic energy of the metal powder 32 is lost. Therefore, the metal powder 32 can be captured in the second flow path forming unit 202. Furthermore, when the metal powder 32 moves in a C3 direction toward the powder capturing device 200, the metal powder 32 sequentially passes through the first ventilation unit 221 of the first flow path forming unit 201 and the second ventilation unit 222 of the second flow path forming unit 202. However, the metal powder 32 having passed through the second ventilation unit 222 collides with the main surface 213a of the third plate-shaped unit 213, and accordingly, the kinetic energy of the metal powder 32 is lost. Therefore, the metal powder 32 can be captured in the third flow path forming unit 203.

As described above, the powder capturing device 200 captures the metal powder 32 due to the collision with the first plate-shaped unit 211, the second plate-shaped unit 212, or the third plate-shaped unit 213. Therefore, by disposing the powder capturing device 200 on the intake side of the main pump 132, it is possible to suppress the intrusion of the metal powder 32 into the main pump 132 and the roughing pump 131.

The powder capturing device 200 according to the present embodiment can suppress the intrusion of powder into the vacuum pump 13 without reducing the exhaust efficiency as much as possible by the two functions described above.

In addition, in the present embodiment, the first plate-shaped unit 211 and the second ventilation unit 222 are disposed to be biased in opposite directions to each other and partially overlapped in the Z direction. Therefore, the metal powder 32 can collide with the first plate-shaped unit 211 or the second plate-shaped unit 212 without hindering the flow of gas.

Furthermore, in the present embodiment, the third flow path forming unit 203 is provided in addition to the first flow path forming unit 201 and the second flow path forming unit 202. Accordingly, this makes it possible to enhance the function of capturing the metal powder 32.

Moreover, in the present embodiment, the gas flow path 208 is formed in such a way to pass through the first ventilation unit 221, the second ventilation unit 222, and the third ventilation unit 223. Accordingly, this makes it possible to bend the gas flow path 208 while maintaining continuity of the gas flow path 208.

Furthermore, the metal powder 32 moving toward the powder capturing device 200 enters at an arbitrary angle from an arbitrary position in the Z direction without being limited to the C1 direction, the C2 direction, and the C3 direction illustrated in FIG. 7. Therefore, in the present embodiment, as a preferred aspect, the first plate-shaped unit 211, the second plate-shaped unit 212, and the third plate-shaped unit 213 are disposed in a state where the facing cannot be linearly expected. This matter will be described with reference to FIG. 8.

Figure 8:
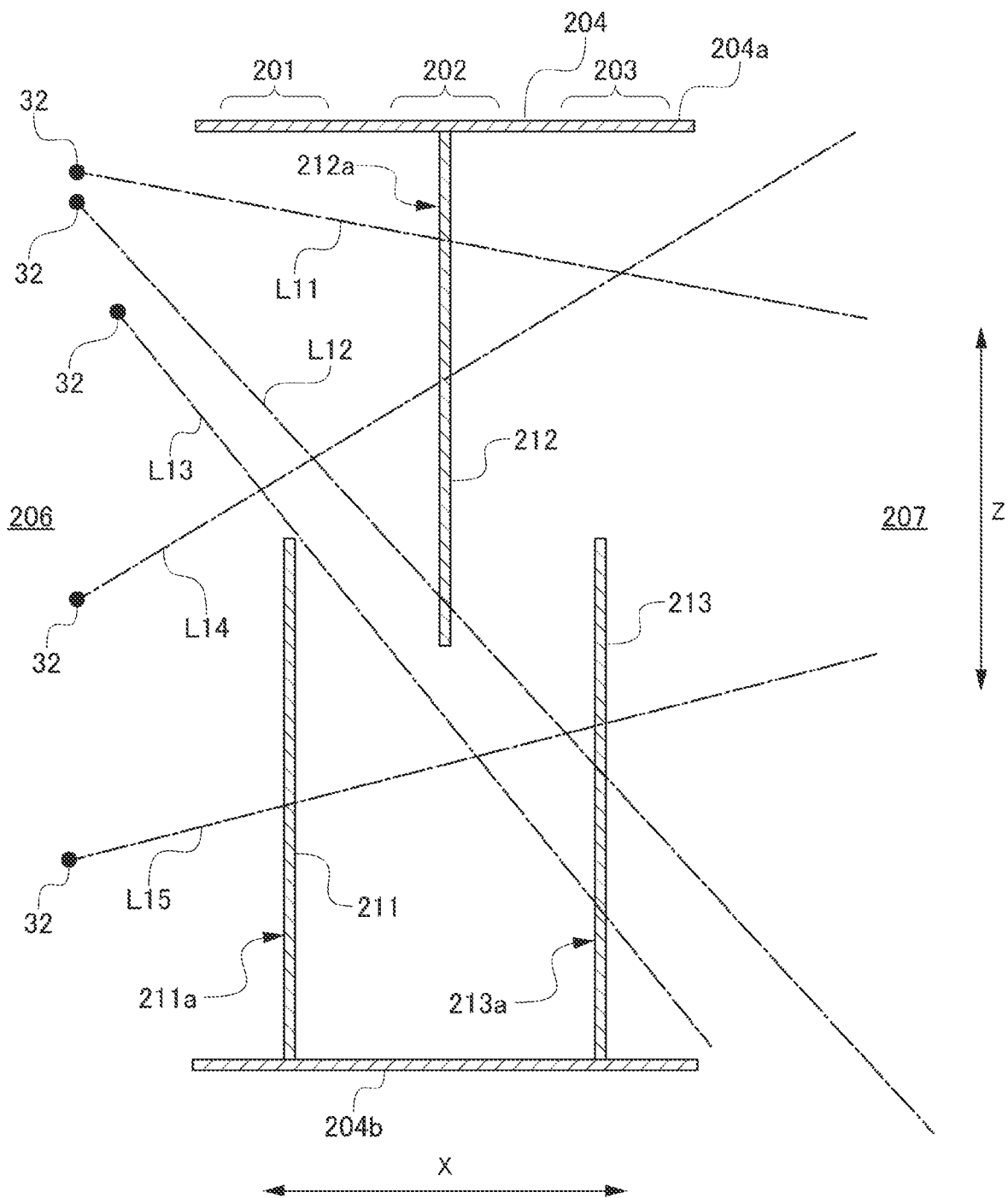
FIG. 8 is a view for explaining an aspect of a powder capturing device according to a second embodiment of the present invention.

First, as illustrated in FIG. 8, the state in which the facing cannot be expected linearly refers to a state in which at least one plate-shaped unit among the first plate-shaped unit 211, the second plate-shaped unit 212, and the third plate-shaped unit 213 is present on the arbitrary straight line connecting the intake unit 206 and the exhaust unit 207. FIG. 8 illustrates five straight lines L11, L12, L13, L14, and L15 as an example of an arbitrary straight line. The five straight lines L11, L12, L13, L14, and L15 are straight lines having different positions in the Z direction on the intake unit 206 side. Furthermore, the five straight lines L11, L12, L13, L14, and L15 have different angles formed by the reference axis line K2 (see FIG. 7).

First, the first plate-shaped unit 211 and the third plate-shaped unit 213 are not present, and only the second plate-shaped unit 212 is present on the straight line L11. Therefore, the metal powder 32 entering along the straight line L11 passes through the first flow path forming unit 201 and then is captured due to the collision with the second plate-shaped unit 212.

Furthermore, the first plate-shaped unit 211 is not present, and the second plate-shaped unit 212 and the third plate-shaped unit 213 are present on the straight line L12. Therefore, the metal powder 32 entering along the straight line L12 passes through the first flow path forming unit 201 and then is captured due to the collision with the second plate-shaped unit 212.

Moreover, the first plate-shaped unit 211 and the second plate-shaped unit 212 are not present, and only the third plate-shaped unit 213 is present on the straight line L13. Therefore, the metal powder 32 entering along the straight line L13 passes through the first flow path forming unit 201 and the second flow path forming unit 202, and then is captured due to the collision with the third plate-shaped unit 213.

Then, the first plate-shaped unit 211 and the third plate-shaped unit 213 are not present, and only the second plate-shaped unit 212 is present on the straight line L14. Therefore, the metal powder 32 entering along the straight line L14 passes through the first flow path forming unit 201 and then is captured due to the collision with the second plate-shaped unit 212. Furthermore, the second plate-shaped unit 212 is not present, and the first plate-shaped unit 211 and the third plate-shaped unit 213 are present on the straight line L15. Therefore, the metal powder 32 entering along the straight line L15 is captured due to the collision with the first plate-shaped unit 111.

As described above, in the present embodiment, at least one plate-shaped unit of the first plate-shaped unit 211, the second plate-shaped unit 212, and the third plate-shaped unit 213 is present on an arbitrary straight line connecting the intake unit 206 and the exhaust unit 207. Therefore, the metal powder 32 entering the powder capturing device 200 from an arbitrary direction can be reliably captured due to the collision with the first plate-shaped unit 211, the second plate-shaped unit 212, or the third plate-shaped unit 213.

Furthermore, in the present embodiment, the first flow path forming unit 201, the second flow path forming unit 202, and the third flow path forming unit 203 are electrically connected to the grounding unit 217 via the support frame 204 and the flange 205. Therefore, by causing the metal powder 32 to collide with the first plate-shaped unit 211, the second plate-shaped unit 212, or the third plate-shaped unit 213, the electric charges of the metal powder 32 can be removed. In addition, the electric charges can be released to the grounding unit 217 such that the first plate-shaped unit 211, the second plate-shaped unit 212, and the third plate-shaped unit 213 are not charged due to the collision with the metal powder 32.

Third Embodiment

Next, the third embodiment of the present invention will be described. The third embodiment is different from the first embodiment and the second embodiment described above in the configuration of the powder capturing device.

Figure 9:
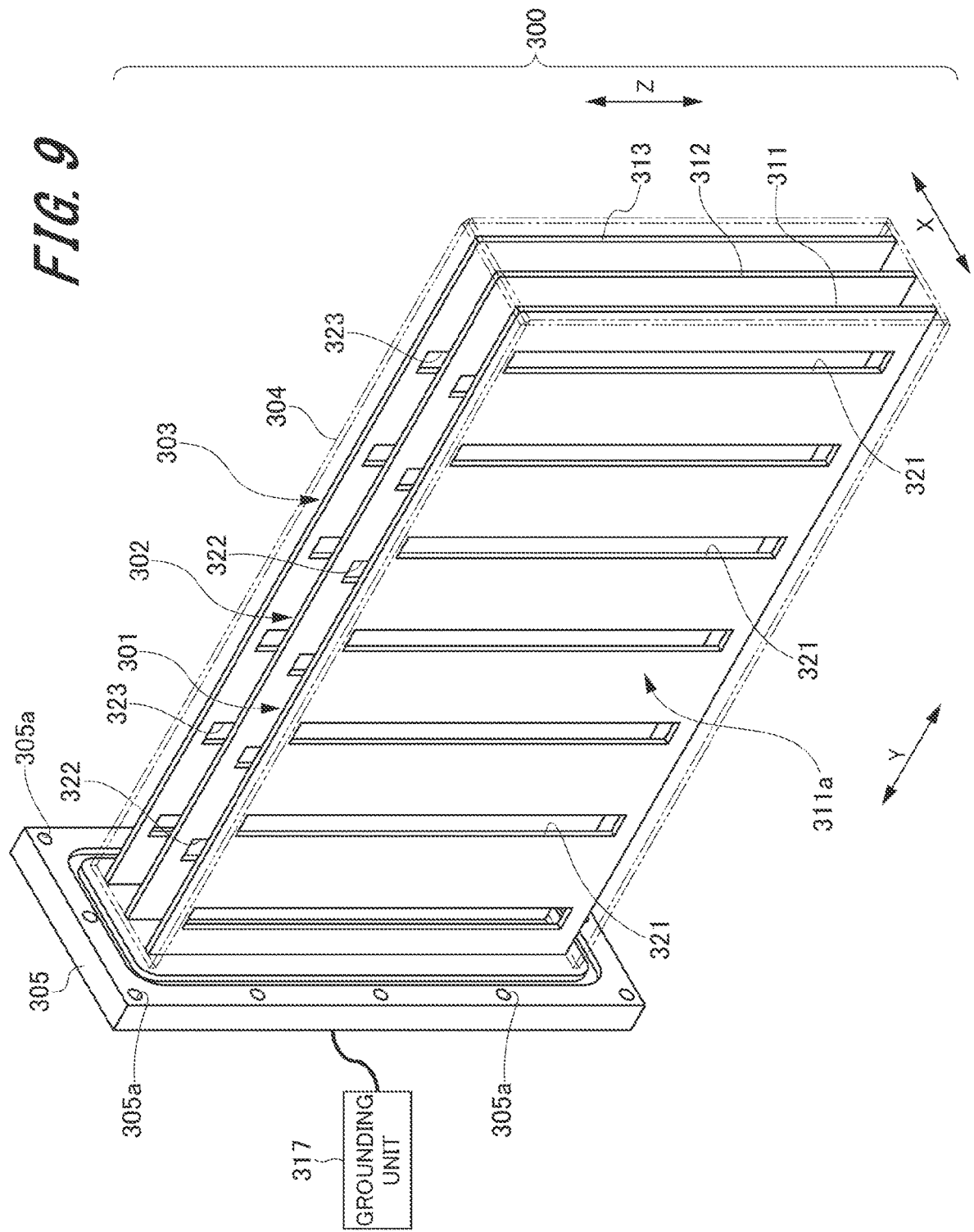
FIG. 9 is a perspective view illustrating a configuration of a powder capturing device included in a three-dimensional PBF-AM apparatus according to a third embodiment of the present invention.

FIG. 9 is a perspective view illustrating a configuration of the powder capturing device included in the three-dimensional PBF-AM apparatus according to the third embodiment of the present invention. In addition, FIG. 10 is a longitudinal sectional view of the powder capturing device shown in FIG. 9, and FIG. 11 is a transverse sectional view of the powder capturing device shown in FIG. 9.

Figure 10:
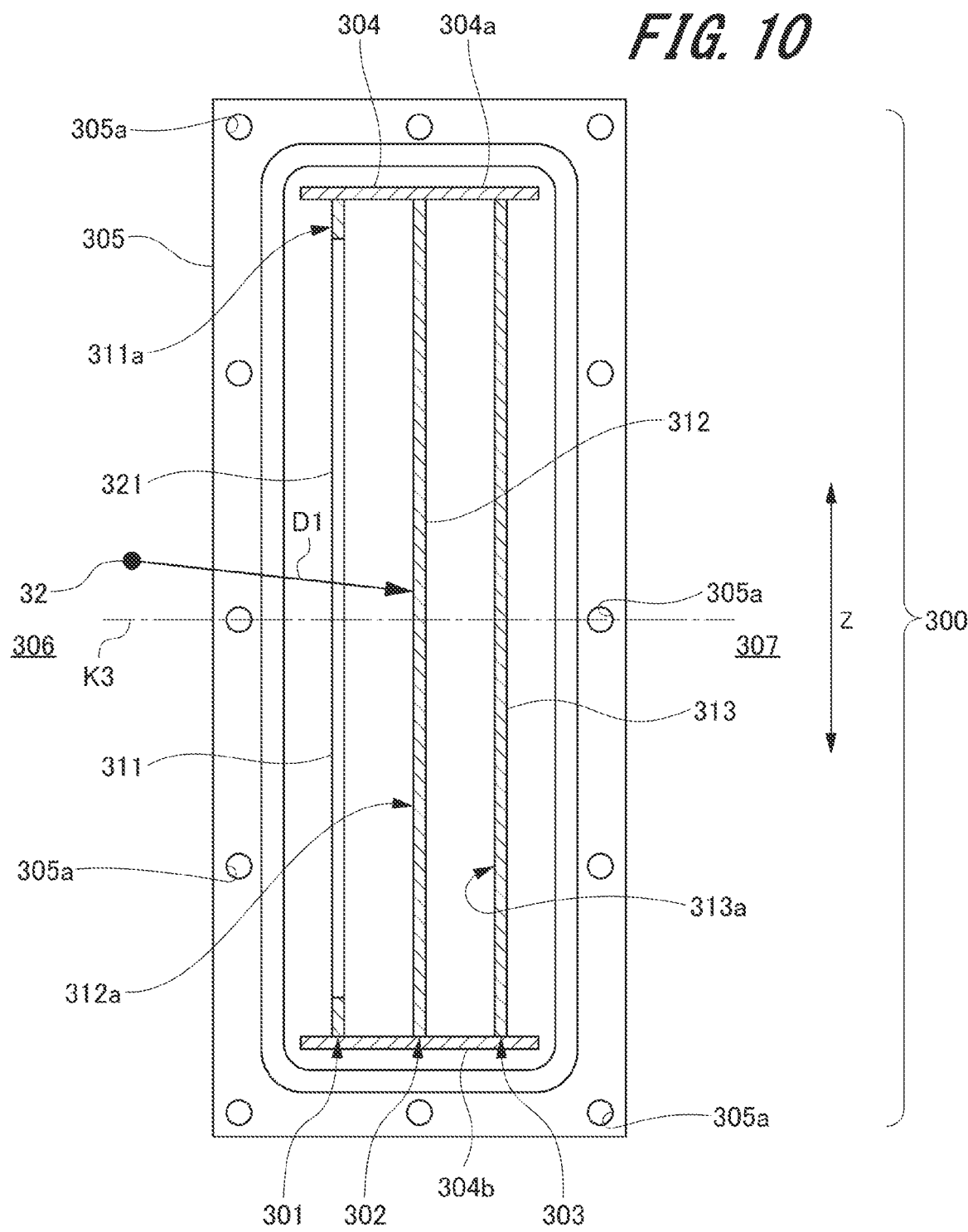
FIG. 10 is a longitudinal sectional view of the powder capturing device shown in FIG. 9.
Figure 11:
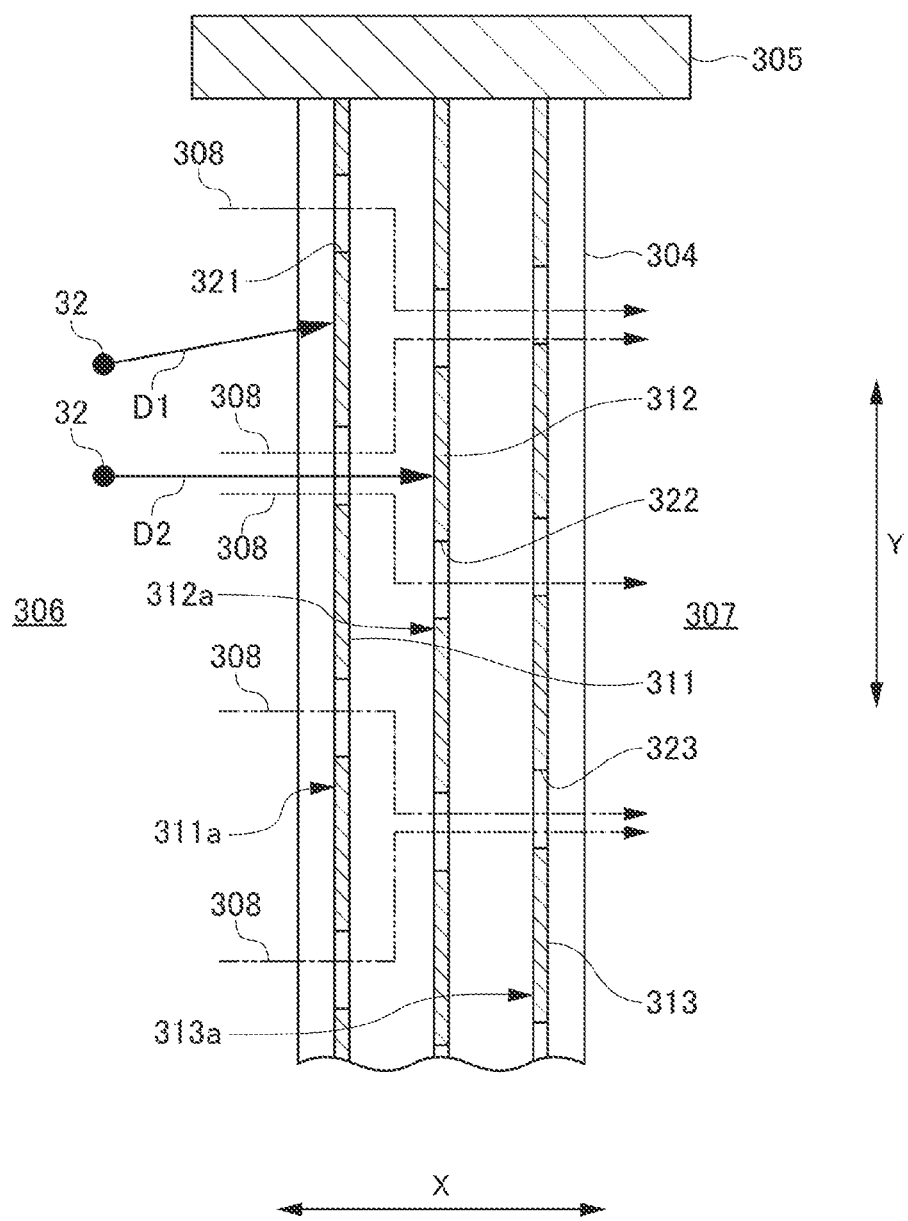
FIG. 11 is a transverse sectional view of the powder capturing device shown in FIG. 9.

As illustrated in FIGS. 9 to 11, a powder capturing device 300 includes a first flow path forming unit 301, a second flow path forming unit 302, a third flow path forming unit 303, a support frame 304, and a flange 305. Furthermore, in FIG. 9, the support frame 304 is made transparent in order to be able to confirm the structures of the first flow path forming unit 301, the second flow path forming unit 302, and the third flow path forming unit 303.

(First Flow Path Forming Unit 301, Second Flow Path Forming Unit 302, and Third Flow Path Forming Unit 303)

As illustrated in FIG. 11, the first flow path forming unit 301, the second flow path forming unit 302, and the third flow path forming unit 303 form a gas flow path 308 that is continuous from an intake unit 306 located on the vacuum chamber 12 side to an exhaust unit 307 located on the main pump 132 side. The gas flow path 208 is a portion through which the gas sucked from the vacuum chamber 12 to the main pump 132 flows when the gas in the vacuum chamber 12 is evacuated due to the operation of the main pump 132.

The first flow path forming unit 301 is constituted by one first plate-shaped unit 311, the second flow path forming unit 302 is constituted by one second plate-shaped unit 312, and the third flow path forming unit 303 is constituted by one third plate-shaped unit 313. Each of the plate-shaped units 311, 312, and 313 is formed in a rectangular shape when viewed from the X direction (the front surface). The first plate-shaped unit 311, the second plate-shaped unit 312, and the third plate-shaped unit 313 are disposed at predetermined intervals in the X direction. In addition, each plate-shaped unit 311, 312, and 313 is disposed in a vertically standing state between an upper side portion 304a and a lower side portion 304b of the support frame 304 in the Z direction.

The first plate-shaped unit 311 is disposed in a direction orthogonal to a reference axis line K3 (see FIG. 10) connecting the intake unit 306 and the exhaust unit 307. The direction orthogonal to the reference axis line K3 refers to a state parallel to the YZ plane. The first plate-shaped unit 311 is provided with a plurality of first ventilation ports 321. The plurality of first ventilation ports 321 are arranged at predetermined intervals in the Y direction. Each of the first ventilation ports 321 is a portion that allows the gas to flow. Each of the first ventilation ports 321 is opened in a rectangular shape elongated in the Z direction when viewed from the X direction. A main surface 311a of the first plate-shaped unit 311 is disposed to face the intake unit 306 side. The main surface 311a of the first plate-shaped unit 311 corresponds to the first catching unit. The first catching unit is a portion excluding the first ventilation port, and is a portion that causes the powder sucked from the intake unit to collide and then catches the powder.

The second plate-shaped unit 312 is disposed on the downstream side of the first plate-shaped unit 311 in the gas flow path 308 in such a way to face the first plate-shaped unit 311. The second plate-shaped unit 312 is provided with a plurality of second ventilation ports 322. The plurality of second ventilation ports 322 are arranged at predetermined intervals in the Y direction. Each of the second ventilation ports 322 is a portion that allows the gas to flow. Each of the second ventilation ports 322 is opened in a rectangular shape elongated in the Z direction when viewed from the X direction. Furthermore, as illustrated in FIG. 11, the second ventilation ports 322 are provided to be shifted in positions from the first ventilation ports 321 in a width direction (the Y direction) of the gas flow path 308. A main surface 312a of the second plate-shaped unit 312 is disposed to face the intake unit 306 side. The main surface 312a of the second plate-shaped unit 312 corresponds to the second catching unit. The second catching unit is a portion excluding the second ventilation port, is located on the downstream side of the gas flow path with respect to the first catching unit, and is a portion that causes the powder passing through the second flow path forming unit to collide and then catches the powder.

The third plate-shaped unit 313 is disposed on the downstream side of the second plate-shaped unit 312 in the gas flow path 308 in such a way to face the second plate-shaped unit 312. The third plate-shaped unit 313 is provided with a plurality of third ventilation ports 323. The plurality of third ventilation ports 323 is arranged at predetermined intervals in the Y direction. Each of the third ventilation ports 323 is a portion that allows the gas to flow. Each of the third ventilation ports 323 is opened in a rectangular shape elongated in the Z direction when viewed from the X direction. In other words, the first ventilation ports 321, the second ventilation ports 322, and the third ventilation ports 323 are opened in the same shape. Furthermore, as illustrated in FIG. 11, the third ventilation ports 323 are provided to be shifted in positions from the second ventilation ports 322 in the width direction (the Y direction) of the gas flow path 308. A main surface 313a of the third plate-shaped unit 313 is disposed to face the intake unit 306 side. The main surface 313a of the third plate-shaped unit 313 corresponds to the third catching unit. The third catching unit is a portion excluding the third ventilation port, is located on the downstream side of the gas flow path with respect to the second catching unit, and is a portion that causes powder passing through the second flow path forming unit to collide and then catches the powder.

The gas flow path 308 is formed in such a way to pass through the first ventilation ports 321, the second ventilation ports 322, and the third ventilation ports 323. In addition, as illustrated in FIG. 11, the gas flow path 308 is bent in a crank shape.

(Support Frame 304)

The support frame 304 is a member that supports the first plate-shaped unit 311 constituting the first flow path forming unit 301, the second plate-shaped unit 312 constituting the second flow path forming unit 302, and the third plate-shaped unit 313 constituting the third flow path forming unit 303. The first plate-shaped unit 311, the second plate-shaped unit 312, and the third plate-shaped unit 313 are attached to the inside of the support frame 304. The support frame 304 is formed in a lateral U-shape or a quadrangular shape as viewed from the X direction in such a way to surround the first plate-shaped unit 311, the second plate-shaped unit 312, and the third plate-shaped unit 313 from three directions or four directions.

(Flange 305)

The flange 305 is a member for attaching the powder capturing device 300 to the exhaust pipe (not illustrated). The exhaust pipe to which the powder capturing device 300 is attached is an exhaust pipe that connects the vacuum chamber 12 and the main pump 132. The flange 305 is formed in a plate shape elongated in the Z direction. The flange 305 is provided with a plurality of attachment holes 305a. The attachment holes 305a are holes for attaching the flange 305 to the exhaust pipe (not illustrated) in a fixed state by screwing. The exhaust pipe (not illustrated) is provided with a rectangular opening portion through which the first flow path forming unit 301, the second flow path forming unit 302, the third flow path forming unit 303, and the support frame 304 can be inserted and removed; and the flange 305 is attached to the exhaust pipe in such a way to close the opening portion.

When the powder capturing device 300 is attached to the exhaust pipe (not illustrated), the intake unit 306 is disposed facing the vacuum chamber 12 side, and the exhaust unit 307 is disposed facing the main pump 132 side. Furthermore, the first flow path forming unit 301, the second flow path forming unit 302, and the third flow path forming unit 303 are disposed inside the exhaust pipe (not illustrated), and the support frame 304 is disposed in contact with the inner wall surface of the exhaust pipe (not illustrated). As a result, the gas flowing through the exhaust pipe due to the operation of the main pump 132 passes through the gas flow path 308 of the powder capturing device 300.

The first flow path forming unit 301, the second flow path forming unit 302, the third flow path forming unit 303, the support frame 304, and the flange 305 described above are all made of a metal material (for example, stainless steel or the like), and are electrically connected to each other by physical contact. Furthermore, the first flow path forming unit 301, the second flow path forming unit 302, and the third flow path forming unit 303 are electrically connected to a grounding unit 317 (see FIG. 9) via the support frame 304 and the flange 305. Moreover, the first flow path forming unit 301, the second flow path forming unit 302, and the third flow path forming unit 303 may be electrically connected directly to the grounding unit 317 without passing through the support frame 304 and the flange 305.

Next, the ventilation function and the powder capturing function of the powder capturing device 300 having the configuration described above will be described.

(Ventilation Function)

When the gas in the vacuum chamber 12 is evacuated by the vacuum pump 13, the gas in the vacuum chamber 12 is sucked by the main pump 132 through the powder capturing device 300 and exhausted from the exhaust port of the main pump 132. At this time, in the portion where the powder capturing device 300 is disposed, the gas flows from the intake unit 306 toward the exhaust unit 307. Furthermore, the gas flows through the gas flow path 308 formed by the first flow path forming unit 301, the second flow path forming unit 302, and the third flow path forming unit 303. In the present embodiment, the gas flow path 308 is continuous from the intake unit 306 to the exhaust unit 307. Therefore, the flow of gas passing through the gas flow path 308 is not hindered. Accordingly, the gas in the vacuum chamber 12 can be efficiently evacuated.

(Powder Capturing Function)

When the smoke phenomenon occurs during the building, the metal powder 32 floating in the vacuum chamber 12 may move toward the powder capturing device 300 due to the suction force of the vacuum pump 13 (mainly the main pump 132). In that case, the metal powder 32 moves linearly toward the powder capturing device 300. As a specific example, as illustrated in FIG. 11, when the metal powder 32 moves in a D1 direction toward the powder capturing device 300, the metal powder 32 collides with the main surface 311a of the first plate-shaped unit 311. Accordingly, since the kinetic energy of the metal powder 32 is lost, the metal powder 32 can be captured in the first flow path forming unit 301. In addition, when the metal powder 32 moves in a D2 direction toward the powder capturing device 200, the metal powder 32 passes through the first ventilation ports 321 of the first plate-shaped unit 311 and collides with the main surface 312a of the second plate-shaped unit 312. Accordingly, since the kinetic energy of the metal powder 32 is lost, the metal powder 32 can be captured in the second flow path forming unit 302. Furthermore, although not illustrated, depending on the direction of the metal powder 32 moving toward the powder capturing device 300, the metal powder 32 may collide with the main surface 313a of the third plate-shaped unit 313 through the first ventilation ports 321 and the second ventilation ports 322. In this case, the metal powder 32 can be captured in the third flow path forming unit 303.

As described above, the powder capturing device 300 captures the metal powder 32 by the collision with the first plate-shaped unit 311, the second plate-shaped unit 312, and the third plate-shaped unit 313. Therefore, by disposing the powder capturing device 300 on the intake side of the main pump 132, it is possible to suppress the intrusion of the metal powder 32 into the main pump 132 and the roughing pump 131.

The powder capturing device 300 according to the present embodiment can suppress the intrusion of powder into the vacuum pump 13 without reducing the exhaust efficiency as much as possible by the two functions described above.

Furthermore, in the present embodiment, the plurality of first ventilation ports 321 provided in the first plate-shaped unit 311 and the plurality of second ventilation ports 322 provided in the second plate-shaped unit 312 are disposed to be shifted in positions in the width direction (the Y direction) of the gas flow path 208. As a result, the metal powder 32 can collide with the first plate-shaped unit 311 or the second plate-shaped unit 312 without hindering the flow of gas.

Moreover, in the present embodiment, a third flow path forming unit 303 is provided in addition to the first flow path forming unit 301 and the second flow path forming unit 302. Accordingly, this makes it possible to enhance the function of capturing the metal powder 32.

Furthermore, in the present embodiment, the gas flow path 308 is formed in such a way to pass through the first ventilation ports 321, the second ventilation ports 322, and the third ventilation ports 323. As a result, the gas flow path 308 can be bent while maintaining the continuity of the gas flow path 308.

In addition, the metal powder 32 moving toward the powder capturing device 300 enters at an arbitrary angle from an arbitrary position in the Y direction without being limited to the D1 direction and the D2 direction illustrated in FIG. 11. Therefore, in the present embodiment, as a preferred aspect, the first plate-shaped unit 311, the second plate-shaped unit 312, and the third plate-shaped unit 313 are disposed in a state where the facing cannot be linearly expected. This matter will be described with reference to FIG. 12.

Figure 12:
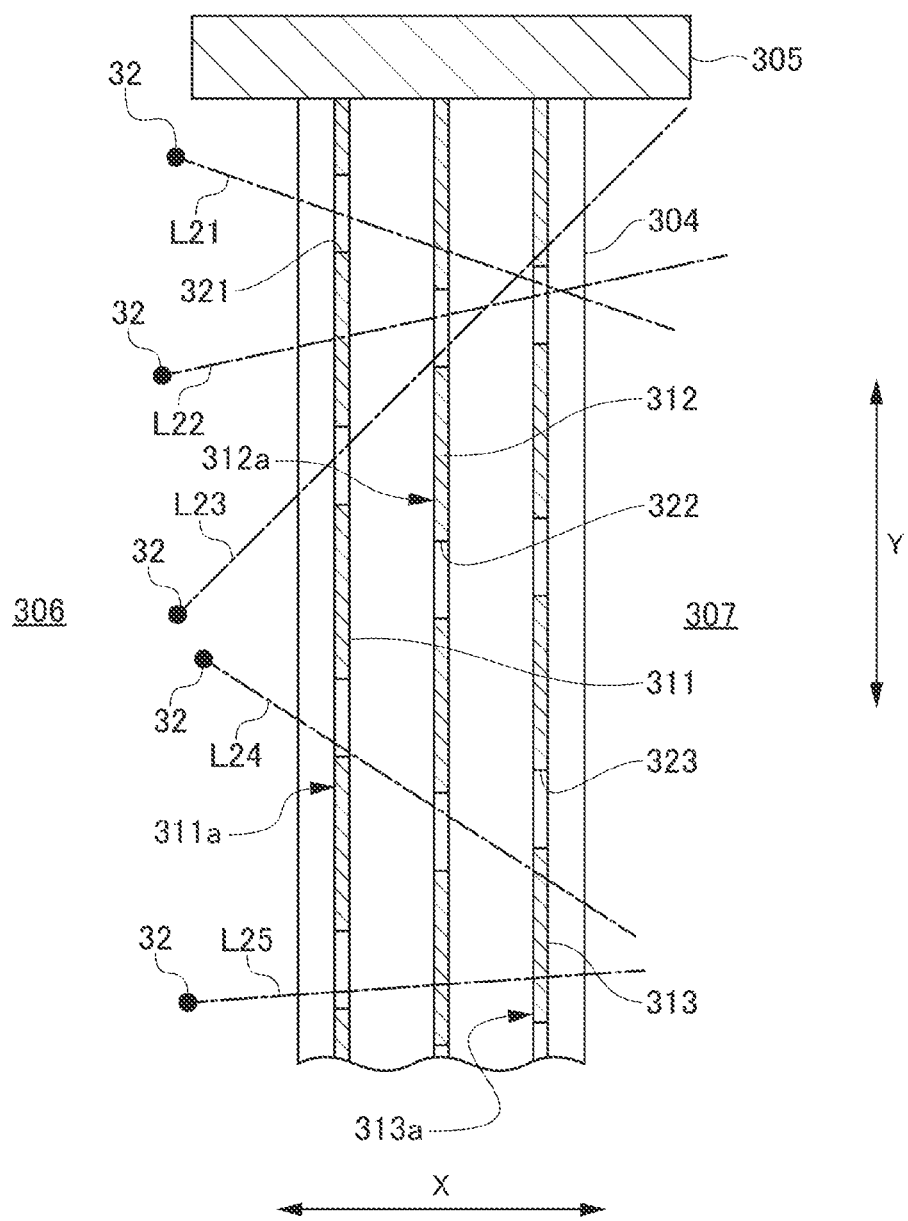
FIG. 12 is a view for explaining an aspect of the powder capturing device according to the third embodiment of the present invention.

First, as illustrated in FIG. 12, the state in which the facing cannot be linearly expected refers to a state in which at least one plate-shaped unit among the first plate-shaped unit 311, the second plate-shaped unit 312, and the third plate-shaped unit 313 is present on an arbitrary straight line connecting the intake unit 306 and the exhaust unit 307. FIG. 11 illustrates five straight lines L21, L22, L23, L24, and L25 as an example of an arbitrary straight line. The five straight lines L21, L22, L23, L24, and L25 are straight lines having different positions in the Y direction on the intake unit 306 side. Furthermore, the five straight lines L21, L22, L23, L24, and L25 have different angles formed by the reference axis line K3 (see FIG. 10). In the following description, when the ventilation port of any of the plate-shaped units is present on the straight line, the plate-shaped units having the ventilation ports are not present on the straight line. In addition, when the main surface (catching unit) of any plate-shaped unit is present on a straight line, the plate-shaped units having the main surfaces are not present on the straight line.

To start with, the first plate-shaped unit 311 and the third plate-shaped unit 313 are not present, and only the second plate-shaped unit 312 is present on the straight line L21. Therefore, the metal powder 32 entering along the straight line L11 is captured due to the collision with the main surface 312a of the second plate-shaped unit 312 after passing through the first ventilation ports 321.

Furthermore, the second plate-shaped unit 312 and the third plate-shaped unit 313 are not present, and only the first plate-shaped unit 311 is present on the straight line L22. Therefore, the metal powder 32 entering along the straight line L22 is captured by colliding with the main surface 311a of the first plate-shaped unit 311.

Moreover, the first plate-shaped unit 311 and the second plate-shaped unit 312 are not present, and only the third plate-shaped unit 313 is present on the straight line L23. Therefore, the metal powder 32 entering along the straight line L23 passes through the first ventilation ports 321 and the second ventilation ports 322, and then is captured due to the collision with the main surface 313a of the third plate-shaped unit 313.

Then, the first plate-shaped unit 311 and the second plate-shaped unit 312 are not present, and only the third plate-shaped unit 313 is present on the straight line L24. Therefore, the metal powder 32 entering along the straight line L24 passes through the first ventilation ports 321 and the second ventilation ports 322, and then is captured due to the collision with the main surface 313a of the third plate-shaped unit 313.

Moreover, the first plate-shaped unit 311 is not present, and the second plate-shaped unit 312 and the third plate-shaped unit 313 are present on the straight line L25. Therefore, the metal powder 32 entering along the straight line L25 is captured due to the collision with the main surface 312a of the second plate-shaped unit 312 after passing through the first ventilation ports 321.

As described above, in the present embodiment, at least one plate-shaped unit of the first plate-shaped unit 311, the second plate-shaped unit 312, and the third plate-shaped unit 313 is present on an arbitrary straight line connecting the intake unit 306 and the exhaust unit 307. Therefore, the metal powder 32 entering the powder capturing device 200 from an arbitrary direction can be reliably captured due to the collision with the first plate-shaped unit 311, the second plate-shaped unit 312, or the third plate-shaped unit 313.

Furthermore, in the present embodiment, the first flow path forming unit 301, the second flow path forming unit 302, and the third flow path forming unit 303 are electrically connected to the grounding unit 317 via the support frame 304 and the flange 305. Therefore, by causing the metal powder 32 to collide with the first plate-shaped unit 311, the second plate-shaped unit 312, or the third plate-shaped unit 313, the electric charges of the metal powder 32 can be removed. In addition, the electric charges can be released to the grounding unit 317 such that the first plate-shaped unit 311, the second plate-shaped unit 312, and the third plate-shaped unit 313 are not charged due to the collision with the metal powder 32.

Modifications and the Like

The technical scope of the present invention is not limited to the embodiment described above, and includes a mode in which various modifications and improvements are added within a range in which specific effects obtained by the constituent elements of the invention and the combination thereof can be derived.

For example, in the first embodiment, the first plate-shaped units 111 and the second plate-shaped units 112 are disposed in a V shape when viewed from the side of the gas flow paths 107, but the present invention is not limited thereto, and the first plate-shaped units and the second plate-shaped units may be disposed in a U shape instead of a V shape.

Furthermore, in the first embodiment, the support frame 103 and the flange 104 are provided in order to dispose the first flow path forming unit 101 and the second flow path forming unit 102 inside the exhaust pipe (not illustrated). However, the present invention is not limited thereto, and various modifications can be made to the configuration for attaching the first flow path forming unit 101 and the second flow path forming unit 102 to the inside of the exhaust pipe. In this respect, the same also applies to the second embodiment and the third embodiment.

Furthermore, in the second embodiment, the first ventilation unit 221, the second ventilation unit 222, and the third ventilation unit 223 are formed by arranging the first plate-shaped unit 211, the second plate-shaped unit 212, and the third plate-shaped unit 213 to be biased in the Z direction, but the present invention is not limited thereto. For example, although not illustrated, the first ventilation unit 221, the second ventilation unit 222, and the third ventilation unit 223 may be formed by arranging the first plate-shaped unit 211, the second plate-shaped unit 212, and the third plate-shaped unit 213 to be biased in the Y direction.

Furthermore, in the second embodiment, the gas flow path 208 is formed by the three flow path forming units 201, 202, and 203, but the present invention is not limited thereto, and the gas flow path may be formed by two or four or more flow path forming units. However, in order to reliably capture the metal powder 32, it is desirable to form a gas flow path by three or more flow path forming units. In this respect, the same also applies to the third embodiment.

Moreover, in the third embodiment, the plurality of first ventilation ports 321 are provided in the first plate-shaped unit 311, but the number of the first ventilation ports 321 may be one. Then, the opening shape and opening dimension of the first ventilation ports 321 can be arbitrarily changed. In this respect, the same also applies to a case where the second ventilation ports 322 are provided in the second plate-shaped unit 312 or a case where the third ventilation ports 323 are provided in the third plate-shaped unit 313.

In addition, although terms such as "parallel" and "orthogonal" have been used in the present description, each term does not mean only strict "parallel" and "orthogonal", but includes "parallel" and "orthogonal" in a strict sense, and further includes meanings of "substantially parallel" and "substantially orthogonal" within a range in which the function can be performed.

The invention claimed is:

1. A three-dimensional powder bed fusion additive manufacturing (PBF-AM) apparatus, comprising:
   a stage on which powder is spread;
   a vacuum chamber in which the stage is disposed;
   a vacuum pump that evacuates gas in the vacuum chamber; and
   powder capturing devices disposed on an intake side of the vacuum pump;
   wherein
   the powder capturing devices comprise:
   a plurality of flow path forming units that form continuous gas flow paths from intake units positioned on the vacuum chamber side to exhaust units positioned on the vacuum pump side, and
   the plurality of flow path forming units comprise at least:
      first flow path forming units having first catching units that cause the powder sucked from the intake units to collide and then catch the powder, the first flow path forming unit comprising a plurality of first plate-shaped units inclined with respect to a reference axis line connecting the intake unit and the exhaust unit; and
      second flow path forming units having second catching units that cause the powder passing through the first flow path forming units to collide and then catch the powder, the second flow path forming unit comprising a plurality of second plate-shaped units inclined in a direction opposite to the first plate-shaped units with respect to the reference axis line,
   wherein each of the plurality of first plate-shaped units is arranged to form a V-shape with a respective one of the plurality of second plate-shaped units along the reference axis line with a drop unit formed as a slit where each of the plurality of first plate-shaped units meets the respective one of the second plate-shaped units.

2. The three-dimensional PBF-AM apparatus according to claim 1, wherein
   grounding units that are grounded are comprised, and
   the plurality of flow path forming units are electrically connected to the grounding unit.

3. The three-dimensional PBF-AM apparatus according to claim 1, wherein
   the first plate-shaped units and the second plate-shaped units are disposed such that at least one plate-shaped unit of the first plate-shaped units and the second plate-shaped units is present on an arbitrary straight line connecting the intake unit and the exhaust unit.

4. The three-dimensional PBF-AM apparatus according to claim 1, wherein
   the first plate-shaped units and the second plate-shaped units are disposed in a plurality of stages in a vertical direction and the drop unit drops the powder into a lower stage.

5. A three-dimensional powder bed fusion additive manufacturing (PBF-AM) apparatus that irradiates metal powder with an electron beam to melt and solidify the metal powder, and sequentially stacks solidified layers to form a manufactured object having a three-dimensional structure, the three-dimensional PBF-AM apparatus comprising:
- a stage on which powder is spread;
- a vacuum chamber in which the stage is disposed;
- a vacuum pump that evacuates gas in the vacuum chamber; and
- powder capturing devices disposed on an intake side of the vacuum pump;

wherein
the powder capturing devices comprise:
- a plurality of flow path forming units that form continuous gas flow paths from intake units positioned on the vacuum chamber side to exhaust units positioned on the vacuum pump side, and
- the plurality of flow path forming units comprise at least:
- first flow path forming units having first catching units that cause the powder sucked from the intake units to collide and then catch the powder;
- second flow path forming units having second catching units that cause the powder passing through the first flow path forming units to collide and then catch the powder; and
- grounding units that are grounded, wherein
the plurality of flow path forming units are electrically connected to the grounding unit, the first flow path forming unit comprising a plurality of first plate-shaped units inclined with respect to a reference axis line connecting the intake unit and the exhaust unit,
the second flow path forming unit comprising a plurality of second shaped units inclined in a direction opposite to the first plate-shaped units with respect to the reference axis line, and the plurality of first plate-shaped units and the plurality of second plate-shaped units are disposed in a plurality of stages in a vertical direction, and each of the plurality of stages, except for a lowermost stage of the plurality of stages, comprises a drop unit for dropping the powder into a lower stage, electric charges of the powder having been removed by collision with the first plate-shaped units and the second plate-shaped units, that are grounded, and the first plate-shaped unit and the second plate-shaped unit of the lowermost stage are connected by a bent portion provided on a bottom surface of a support frame that supports the plurality of stages and at a boundary between ends of the first plate-shaped unit and the second plate-shaped unit of the lowermost stage such that the powder fallen through the drop unit is collected by the first plate-shaped unit and the second plate-shaped unit of the lowermost stage.

* * * * *